(12) United States Patent
Sinha et al.

(10) Patent No.: US 11,727,738 B2
(45) Date of Patent: Aug. 15, 2023

(54) BUILDING CAMPUS WITH INTEGRATED SMART ENVIRONMENT

(71) Applicant: Johnson Controls Tyco IP Holdings LLP, Milwaukee, WI (US)

(72) Inventors: Sudhi R. Sinha, Milwaukee, WI (US); Youngchoon Park, Brookfield, WI (US); Ada L. Ma, Kenmore, WA (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 0 days.

(21) Appl. No.: 17/479,994

(22) Filed: Sep. 20, 2021

(65) Prior Publication Data

US 2022/0148356 A1    May 12, 2022

Related U.S. Application Data

(63) Continuation of application No. 16/198,696, filed on Nov. 21, 2018, now Pat. No. 11,127,235.
(Continued)

(51) Int. Cl.
*G07C 9/22* (2020.01)
*G05B 15/02* (2006.01)
(Continued)

(52) U.S. Cl.
CPC .............. *G07C 9/22* (2020.01); *G05B 15/02* (2013.01); *G06F 21/32* (2013.01); *G07C 9/27* (2020.01)

(58) Field of Classification Search
None
See application file for complete search history.

(56) References Cited

U.S. PATENT DOCUMENTS

| 5,301,109 A | 4/1994 | Landauer et al. |
| 5,446,677 A | 8/1995 | Jensen et al. |

(Continued)

FOREIGN PATENT DOCUMENTS

| CN | 101415011 A | 4/2009 |
| CN | 102136099 A | 7/2011 |

(Continued)

OTHER PUBLICATIONS

Balaji et al., "Brick: Metadata schema for portable smart building applications," Applied Energy, 2018 (20 pages).
(Continued)

*Primary Examiner* — K. Wong
(74) *Attorney, Agent, or Firm* — Foley & Lardner LLP

(57) ABSTRACT

A building campus with an integrated smart environment can provide frictionless access control and device management services among other benefits. A method for providing frictionless access control includes maintaining a directory of individuals associated with the building, receiving identity information related to an individual seeking authorization to enter an access point in the building from at least one access control device, identifying the individual by comparing the identity information to the directory, identifying a user device associated with the individual using the directory, sending an authorization request to the user device, and authorizing the individual to enter the access point upon completion of the authorization request. A system for providing device management services includes registering devices from different manufacturers to a directory and authorizing one or more users to access and monitor parameters associated with each device.

20 Claims, 17 Drawing Sheets

Related U.S. Application Data

(60) Provisional application No. 62/590,167, filed on Nov. 22, 2017.

(51) Int. Cl.
*G06F 21/32* (2013.01)
*G07C 9/27* (2020.01)

(56) References Cited

U.S. PATENT DOCUMENTS

| | | | |
|---|---|---|---|
| 5,581,478 A | 12/1996 | Cruse et al. | |
| 5,812,962 A | 9/1998 | Kovac | |
| 5,960,381 A | 9/1999 | Singers et al. | |
| 5,973,662 A | 10/1999 | Singers et al. | |
| 6,014,612 A | 1/2000 | Larson et al. | |
| 6,031,547 A | 2/2000 | Kennedy | |
| 6,134,511 A | 10/2000 | Subbarao | |
| 6,157,943 A | 12/2000 | Meyer | |
| 6,285,966 B1 | 9/2001 | Brown et al. | |
| 6,363,422 B1 | 3/2002 | Hunter et al. | |
| 6,385,510 B1 | 5/2002 | Hoog et al. | |
| 6,389,331 B1 | 5/2002 | Jensen et al. | |
| 6,401,027 B1 | 6/2002 | Xu et al. | |
| 6,437,691 B1 | 8/2002 | Sandelman et al. | |
| 6,477,518 B1 | 11/2002 | Li et al. | |
| 6,487,457 B1 | 11/2002 | Hull et al. | |
| 6,493,755 B1 | 12/2002 | Hansen et al. | |
| 6,577,323 B1 | 6/2003 | Jamieson et al. | |
| 6,626,366 B2 | 9/2003 | Kayahara et al. | |
| 6,646,660 B1 | 11/2003 | Patty | |
| 6,704,016 B1 | 3/2004 | Oliver et al. | |
| 6,732,540 B2 | 5/2004 | Sugihara et al. | |
| 6,764,019 B1 | 7/2004 | Kayahara et al. | |
| 6,782,385 B2 | 8/2004 | Natsumeda et al. | |
| 6,813,532 B2 | 11/2004 | Eryurek et al. | |
| 6,816,811 B2 | 11/2004 | Seem | |
| 6,823,680 B2 | 11/2004 | Jayanth | |
| 6,826,454 B2 | 11/2004 | Sulfstede | |
| 6,865,511 B2 | 3/2005 | Frerichs et al. | |
| 6,925,338 B2 | 8/2005 | Eryurek et al. | |
| 6,986,138 B1 | 1/2006 | Sakaguchi et al. | |
| 7,031,880 B1 | 4/2006 | Seem et al. | |
| 7,284,698 B2 | 10/2007 | Sogo | |
| 7,401,057 B2 | 7/2008 | Eder | |
| 7,552,467 B2 | 6/2009 | Lindsay | |
| 7,627,544 B2 | 12/2009 | Chkodrov et al. | |
| 7,818,249 B2 | 10/2010 | Lovejoy et al. | |
| 7,889,051 B1 | 2/2011 | Billig et al. | |
| 7,996,488 B1 | 8/2011 | Casabella et al. | |
| 8,078,330 B2 | 12/2011 | Brickfield et al. | |
| 8,104,044 B1 | 1/2012 | Scofield et al. | |
| 8,126,145 B1 | 2/2012 | Tewari et al. | |
| 8,229,470 B1 | 7/2012 | Ranjan et al. | |
| 8,401,991 B2 | 3/2013 | Wu et al. | |
| 8,495,745 B1 | 7/2013 | Schrecker et al. | |
| 8,516,016 B2 | 8/2013 | Park et al. | |
| 8,532,808 B2 | 9/2013 | Drees et al. | |
| 8,532,839 B2 | 9/2013 | Drees et al. | |
| 8,600,556 B2 | 12/2013 | Nesler et al. | |
| 8,635,182 B2 | 1/2014 | Mackay | |
| 8,682,921 B2 | 3/2014 | Park et al. | |
| 8,731,724 B2 | 5/2014 | Drees et al. | |
| 8,737,334 B2 | 5/2014 | Ahn et al. | |
| 8,738,334 B2 | 5/2014 | Jiang et al. | |
| 8,751,487 B2 | 6/2014 | Byrne et al. | |
| 8,788,097 B2 | 7/2014 | Drees et al. | |
| 8,805,995 B1 | 8/2014 | Oliver | |
| 8,843,238 B2 | 9/2014 | Wenzel et al. | |
| 8,874,071 B2 | 10/2014 | Sherman et al. | |
| 8,941,465 B2 | 1/2015 | Pineau et al. | |
| 8,990,127 B2 | 3/2015 | Taylor | |
| 9,019,071 B1 | 4/2015 | Mallard | |
| 9,070,113 B2 | 6/2015 | Shafiee et al. | |
| 9,116,978 B2 | 8/2015 | Park et al. | |
| 9,185,095 B1 | 11/2015 | Moritz et al. | |
| 9,189,527 B2 | 11/2015 | Park et al. | |
| 9,196,009 B2 | 11/2015 | Drees et al. | |
| 9,229,966 B2 | 1/2016 | Aymeloglu et al. | |
| 9,286,582 B2 | 3/2016 | Drees et al. | |
| 9,311,807 B2 | 4/2016 | Schultz et al. | |
| 9,344,751 B1 | 5/2016 | Ream et al. | |
| 9,354,968 B2 | 5/2016 | Wenzel et al. | |
| 9,507,686 B2 | 11/2016 | Horn et al. | |
| 9,524,594 B2 | 12/2016 | Ouyang et al. | |
| 9,558,196 B2 | 1/2017 | Johnston et al. | |
| 9,652,813 B2 | 5/2017 | Gifford et al. | |
| 9,753,455 B2 | 9/2017 | Drees | |
| 9,811,249 B2 | 11/2017 | Chen et al. | |
| 9,838,844 B2 | 12/2017 | Emeis et al. | |
| 9,886,478 B2 | 2/2018 | Mukherjee | |
| 9,948,359 B2 | 4/2018 | Horton | |
| 10,055,114 B2 | 8/2018 | Shah et al. | |
| 10,055,206 B2 | 8/2018 | Park et al. | |
| 10,116,461 B2 | 10/2018 | Fairweather et al. | |
| 10,169,454 B2 | 1/2019 | Ait-Mokhtar et al. | |
| 10,171,586 B2 | 1/2019 | Shaashua et al. | |
| 10,187,258 B2 | 1/2019 | Nagesh et al. | |
| 10,514,963 B2 | 12/2019 | Shrivastava et al. | |
| 10,515,098 B2 | 12/2019 | Park et al. | |
| 10,534,326 B2 | 1/2020 | Sridharan et al. | |
| 10,536,295 B2 | 1/2020 | Fairweather et al. | |
| 10,600,263 B2 * | 3/2020 | Park | G06F 8/65 |
| 10,705,492 B2 | 7/2020 | Harvey | |
| 10,708,078 B2 | 7/2020 | Harvey | |
| 10,845,771 B2 | 11/2020 | Harvey | |
| 10,854,194 B2 | 12/2020 | Park et al. | |
| 10,862,928 B1 | 12/2020 | Badawy et al. | |
| 10,921,760 B2 | 2/2021 | Harvey | |
| 10,921,972 B2 | 2/2021 | Park et al. | |
| 10,969,133 B2 | 4/2021 | Harvey | |
| 10,986,121 B2 | 4/2021 | Stockdale et al. | |
| 11,016,998 B2 | 5/2021 | Park et al. | |
| 11,024,292 B2 | 6/2021 | Park et al. | |
| 11,038,709 B2 | 6/2021 | Park et al. | |
| 11,070,390 B2 | 7/2021 | Park et al. | |
| 11,073,976 B2 | 7/2021 | Park et al. | |
| 11,108,587 B2 | 8/2021 | Park et al. | |
| 11,113,295 B2 | 9/2021 | Park et al. | |
| 11,127,235 B2 * | 9/2021 | Sinha | G07C 9/27 |
| 11,229,138 B1 | 1/2022 | Harvey et al. | |
| 11,314,726 B2 | 4/2022 | Park et al. | |
| 11,314,788 B2 | 4/2022 | Park et al. | |
| 2002/0010562 A1 | 1/2002 | Schleiss et al. | |
| 2002/0016639 A1 | 2/2002 | Smith et al. | |
| 2002/0059229 A1 | 5/2002 | Natsumeda et al. | |
| 2002/0123864 A1 | 9/2002 | Eryurek et al. | |
| 2002/0147506 A1 | 10/2002 | Eryurek et al. | |
| 2002/0177909 A1 | 11/2002 | Fu et al. | |
| 2003/0005486 A1 | 1/2003 | Ridolfo et al. | |
| 2003/0014130 A1 | 1/2003 | Grumelart | |
| 2003/0073432 A1 | 4/2003 | Meade, II | |
| 2003/0158704 A1 | 8/2003 | Triginai et al. | |
| 2003/0171851 A1 | 9/2003 | Brickfield et al. | |
| 2003/0200059 A1 | 10/2003 | Ignatowski et al. | |
| 2004/0068390 A1 | 4/2004 | Saunders | |
| 2004/0128314 A1 | 7/2004 | Katibah et al. | |
| 2004/0133314 A1 | 7/2004 | Ehlers et al. | |
| 2004/0199360 A1 | 10/2004 | Friman et al. | |
| 2005/0055308 A1 | 3/2005 | Meyer et al. | |
| 2005/0108262 A1 | 5/2005 | Fawcett et al. | |
| 2005/0154494 A1 | 7/2005 | Ahmed | |
| 2005/0278703 A1 | 12/2005 | Lo et al. | |
| 2005/0283337 A1 | 12/2005 | Sayal | |
| 2006/0095521 A1 | 5/2006 | Patinkin | |
| 2006/0140207 A1 | 6/2006 | Eschbach et al. | |
| 2006/0184479 A1 | 8/2006 | Levine | |
| 2006/0200476 A1 | 9/2006 | Gottumukkala et al. | |
| 2006/0265751 A1 | 11/2006 | Cosquer et al. | |
| 2006/0271589 A1 | 11/2006 | Horowitz et al. | |
| 2007/0028179 A1 | 2/2007 | Levin et al. | |
| 2007/0203693 A1 | 8/2007 | Estes | |
| 2007/0261062 A1 | 11/2007 | Bansal et al. | |
| 2007/0273497 A1 | 11/2007 | Kuroda et al. | |
| 2007/0273610 A1 | 11/2007 | Baillot | |

(56) References Cited

U.S. PATENT DOCUMENTS

| | | |
|---|---|---|
| 2008/0034425 A1 | 2/2008 | Overcash et al. |
| 2008/0094230 A1 | 4/2008 | Mock et al. |
| 2008/0097816 A1 | 4/2008 | Freire et al. |
| 2008/0186160 A1 | 8/2008 | Kim et al. |
| 2008/0249756 A1 | 10/2008 | Chaisuparasmikul |
| 2008/0252723 A1 | 10/2008 | Park |
| 2008/0281472 A1 | 11/2008 | Podgorny et al. |
| 2009/0195349 A1 | 8/2009 | Frader-Thompson et al. |
| 2010/0045439 A1 | 2/2010 | Tak et al. |
| 2010/0058248 A1 | 3/2010 | Park |
| 2010/0131533 A1 | 5/2010 | Ortiz |
| 2010/0274366 A1 | 10/2010 | Fata et al. |
| 2010/0281387 A1 | 11/2010 | Holland et al. |
| 2010/0286937 A1 | 11/2010 | Hedley et al. |
| 2010/0324962 A1 | 12/2010 | Nesler et al. |
| 2011/0015802 A1 | 1/2011 | Imes |
| 2011/0047418 A1 | 2/2011 | Drees et al. |
| 2011/0061015 A1 | 3/2011 | Drees et al. |
| 2011/0071685 A1 | 3/2011 | Huneycutt et al. |
| 2011/0077950 A1 | 3/2011 | Hughston |
| 2011/0087650 A1 | 4/2011 | Mackay et al. |
| 2011/0087988 A1 | 4/2011 | Ray et al. |
| 2011/0088000 A1 | 4/2011 | Mackay |
| 2011/0125737 A1 | 5/2011 | Pothering et al. |
| 2011/0137853 A1 | 6/2011 | Mackay |
| 2011/0153603 A1 | 6/2011 | Adiba et al. |
| 2011/0154363 A1 | 6/2011 | Karmarkar |
| 2011/0157357 A1 | 6/2011 | Weisensale et al. |
| 2011/0178977 A1 | 7/2011 | Drees |
| 2011/0191343 A1 | 8/2011 | Heaton et al. |
| 2011/0205022 A1 | 8/2011 | Cavallaro et al. |
| 2011/0218777 A1 | 9/2011 | Chen et al. |
| 2012/0011126 A1 | 1/2012 | Park et al. |
| 2012/0011141 A1 | 1/2012 | Park et al. |
| 2012/0022698 A1 | 1/2012 | Mackay |
| 2012/0062577 A1 | 3/2012 | Nixon |
| 2012/0064923 A1 | 3/2012 | Imes et al. |
| 2012/0083930 A1 | 4/2012 | Ilic et al. |
| 2012/0100825 A1 | 4/2012 | Sherman et al. |
| 2012/0101637 A1 | 4/2012 | Imes et al. |
| 2012/0135759 A1 | 5/2012 | Imes et al. |
| 2012/0136485 A1 | 5/2012 | Weber et al. |
| 2012/0158633 A1 | 6/2012 | Eder |
| 2012/0259583 A1 | 10/2012 | Noboa et al. |
| 2012/0272228 A1 | 10/2012 | Marndi et al. |
| 2012/0278051 A1 | 11/2012 | Jiang et al. |
| 2013/0007063 A1 | 1/2013 | Kalra et al. |
| 2013/0038430 A1 | 2/2013 | Blower et al. |
| 2013/0038707 A1 | 2/2013 | Cunningham et al. |
| 2013/0060820 A1 | 3/2013 | Bulusu et al. |
| 2013/0086497 A1 | 4/2013 | Ambuhl et al. |
| 2013/0097706 A1 | 4/2013 | Titonis et al. |
| 2013/0103221 A1 | 4/2013 | Raman et al. |
| 2013/0167035 A1 | 6/2013 | Imes et al. |
| 2013/0170710 A1 | 7/2013 | Kuoch et al. |
| 2013/0204836 A1 | 8/2013 | Choi et al. |
| 2013/0246916 A1 | 9/2013 | Reimann et al. |
| 2013/0247205 A1 | 9/2013 | Schrecker et al. |
| 2013/0262035 A1 | 10/2013 | Mills |
| 2013/0275174 A1 | 10/2013 | Bennett et al. |
| 2013/0275908 A1 | 10/2013 | Reichard |
| 2013/0297050 A1 | 11/2013 | Reichard et al. |
| 2013/0298244 A1 | 11/2013 | Kumar et al. |
| 2013/0331995 A1 | 12/2013 | Rosen |
| 2014/0032506 A1 | 1/2014 | Hoey et al. |
| 2014/0059483 A1 | 2/2014 | Mairs et al. |
| 2014/0081652 A1 | 3/2014 | Klindworth |
| 2014/0135952 A1 | 5/2014 | Maehara |
| 2014/0152651 A1 | 6/2014 | Chen et al. |
| 2014/0172184 A1 | 6/2014 | Schmidt et al. |
| 2014/0189861 A1 | 7/2014 | Gupta et al. |
| 2014/0207282 A1 | 7/2014 | Angle et al. |
| 2014/0258052 A1 | 9/2014 | Khuti et al. |
| 2014/0269614 A1 | 9/2014 | Maguire et al. |
| 2014/0277765 A1 | 9/2014 | Karimi et al. |
| 2014/0278461 A1 | 9/2014 | Artz |
| 2014/0327555 A1 | 11/2014 | Sager et al. |
| 2015/0019174 A1 | 1/2015 | Kiff et al. |
| 2015/0042240 A1 | 2/2015 | Aggarwal et al. |
| 2015/0105917 A1 | 4/2015 | Sasaki et al. |
| 2015/0145468 A1 | 5/2015 | Ma et al. |
| 2015/0156031 A1 | 6/2015 | Fadell et al. |
| 2015/0168931 A1 | 6/2015 | Jin |
| 2015/0172300 A1 | 6/2015 | Cochenour |
| 2015/0178421 A1 | 6/2015 | Borrelli et al. |
| 2015/0185261 A1 | 7/2015 | Frader-Thompson et al. |
| 2015/0186777 A1 | 7/2015 | Lecue et al. |
| 2015/0202962 A1 | 7/2015 | Habashima et al. |
| 2015/0204563 A1 | 7/2015 | Imes et al. |
| 2015/0235267 A1 | 8/2015 | Steube et al. |
| 2015/0241895 A1 | 8/2015 | Lu et al. |
| 2015/0244730 A1 | 8/2015 | Vu et al. |
| 2015/0244732 A1 | 8/2015 | Golshan et al. |
| 2015/0261863 A1 | 9/2015 | Dey et al. |
| 2015/0263900 A1 | 9/2015 | Polyakov et al. |
| 2015/0286969 A1 | 10/2015 | Warner et al. |
| 2015/0295796 A1 | 10/2015 | Hsiao et al. |
| 2015/0304193 A1 | 10/2015 | Ishii et al. |
| 2015/0316918 A1 | 11/2015 | Schleiss et al. |
| 2015/0324422 A1 | 11/2015 | Elder |
| 2015/0341212 A1 | 11/2015 | Hsiao et al. |
| 2015/0348417 A1 | 12/2015 | Ignaczak et al. |
| 2015/0379080 A1 | 12/2015 | Jochimski |
| 2016/0011753 A1 | 1/2016 | Mcfarland et al. |
| 2016/0033946 A1 | 2/2016 | Zhu et al. |
| 2016/0035246 A1 | 2/2016 | Curtis |
| 2016/0065601 A1 | 3/2016 | Gong et al. |
| 2016/0070736 A1 | 3/2016 | Swan et al. |
| 2016/0078229 A1 | 3/2016 | Gong et al. |
| 2016/0090839 A1 | 3/2016 | Stolarczyk |
| 2016/0119434 A1 | 4/2016 | Dong et al. |
| 2016/0127712 A1 | 5/2016 | Alfredsson et al. |
| 2016/0139752 A1 | 5/2016 | Shim et al. |
| 2016/0163186 A1 | 6/2016 | Davidson et al. |
| 2016/0170390 A1 | 6/2016 | Xie et al. |
| 2016/0171862 A1 | 6/2016 | Das et al. |
| 2016/0173816 A1 | 6/2016 | Huenerfauth et al. |
| 2016/0179315 A1 | 6/2016 | Sarao et al. |
| 2016/0179342 A1 | 6/2016 | Sarao et al. |
| 2016/0179990 A1 | 6/2016 | Sarao et al. |
| 2016/0195856 A1 | 7/2016 | Spero |
| 2016/0212165 A1 | 7/2016 | Singla et al. |
| 2016/0239660 A1 | 8/2016 | Azvine et al. |
| 2016/0239756 A1 | 8/2016 | Aggour et al. |
| 2016/0313751 A1 | 10/2016 | Risbeck et al. |
| 2016/0313752 A1 | 10/2016 | Przybylski |
| 2016/0313902 A1 | 10/2016 | Hill et al. |
| 2016/0350364 A1 | 12/2016 | Anicic et al. |
| 2016/0357828 A1 | 12/2016 | Tobin et al. |
| 2016/0358432 A1 | 12/2016 | Branscomb et al. |
| 2016/0363336 A1 | 12/2016 | Roth et al. |
| 2016/0370258 A1 | 12/2016 | Perez |
| 2016/0378306 A1 | 12/2016 | Kresl et al. |
| 2016/0379326 A1 | 12/2016 | Chan-Gove et al. |
| 2017/0006135 A1 | 1/2017 | Siebel |
| 2017/0011318 A1 | 1/2017 | Vigano et al. |
| 2017/0017221 A1 | 1/2017 | Lamparter et al. |
| 2017/0039255 A1 | 2/2017 | Raj et al. |
| 2017/0052536 A1 | 2/2017 | Warner et al. |
| 2017/0053441 A1 | 2/2017 | Nadumane et al. |
| 2017/0063894 A1 | 3/2017 | Muddu et al. |
| 2017/0068409 A1 | 3/2017 | Nair |
| 2017/0070775 A1 | 3/2017 | Taxier et al. |
| 2017/0075984 A1 | 3/2017 | Deshpande et al. |
| 2017/0084168 A1 | 3/2017 | Janchookiat |
| 2017/0090437 A1 | 3/2017 | Veeramani et al. |
| 2017/0093700 A1 | 3/2017 | Gilley et al. |
| 2017/0098086 A1 | 4/2017 | Hoernecke et al. |
| 2017/0103327 A1 | 4/2017 | Penilla et al. |
| 2017/0103403 A1 | 4/2017 | Chu et al. |
| 2017/0123389 A1 | 5/2017 | Baez et al. |
| 2017/0134415 A1 | 5/2017 | Muddu et al. |
| 2017/0177715 A1 | 6/2017 | Chang et al. |
| 2017/0180147 A1 | 6/2017 | Brandman et al. |

(56) References Cited

U.S. PATENT DOCUMENTS

| | | |
|---|---|---|
| 2017/0188216 A1 | 6/2017 | Koskas et al. |
| 2017/0212482 A1 | 7/2017 | Boettcher et al. |
| 2017/0212668 A1 | 7/2017 | Shah et al. |
| 2017/0220641 A1 | 8/2017 | Chi et al. |
| 2017/0230930 A1 | 8/2017 | Frey |
| 2017/0235817 A1 | 8/2017 | Deodhar et al. |
| 2017/0251182 A1 | 8/2017 | Siminoff et al. |
| 2017/0270124 A1 | 9/2017 | Nagano et al. |
| 2017/0277769 A1 | 9/2017 | Pasupathy et al. |
| 2017/0278003 A1 | 9/2017 | Liu |
| 2017/0294132 A1 | 10/2017 | Colmenares |
| 2017/0315522 A1 | 11/2017 | Kwon et al. |
| 2017/0315697 A1 | 11/2017 | Jacobson et al. |
| 2017/0322534 A1 | 11/2017 | Sinha et al. |
| 2017/0323389 A1 | 11/2017 | Vavrasek |
| 2017/0329289 A1 | 11/2017 | Kohn et al. |
| 2017/0336770 A1 | 11/2017 | Macmillan |
| 2017/0345287 A1 | 11/2017 | Fuller et al. |
| 2017/0351957 A1 | 12/2017 | Lecue et al. |
| 2017/0357225 A1 | 12/2017 | Asp et al. |
| 2017/0357490 A1 | 12/2017 | Park et al. |
| 2017/0357908 A1 | 12/2017 | Cabadi et al. |
| 2018/0012159 A1 | 1/2018 | Kozloski et al. |
| 2018/0013579 A1 | 1/2018 | Fairweather et al. |
| 2018/0024520 A1 | 1/2018 | Sinha et al. |
| 2018/0039238 A1 | 2/2018 | Gärtner et al. |
| 2018/0048485 A1 | 2/2018 | Pelton et al. |
| 2018/0069932 A1 | 3/2018 | Tiwari et al. |
| 2018/0114140 A1 | 4/2018 | Chen et al. |
| 2018/0137288 A1 | 5/2018 | Polyakov |
| 2018/0157930 A1 | 6/2018 | Rutschman et al. |
| 2018/0162400 A1 | 6/2018 | Abdar |
| 2018/0176241 A1 | 6/2018 | Manadhata et al. |
| 2018/0198627 A1 | 7/2018 | Mullins |
| 2018/0203961 A1 | 7/2018 | Aisu et al. |
| 2018/0239982 A1 | 8/2018 | Rutschman et al. |
| 2018/0275625 A1 | 9/2018 | Park et al. |
| 2018/0276962 A1 | 9/2018 | Butler et al. |
| 2018/0292797 A1 | 10/2018 | Lamparter et al. |
| 2018/0336785 A1 | 11/2018 | Ghannam et al. |
| 2018/0359111 A1 | 12/2018 | Harvey |
| 2018/0364654 A1 | 12/2018 | Locke et al. |
| 2019/0005025 A1 | 1/2019 | Malabarba |
| 2019/0013023 A1 | 1/2019 | Pourmohammad et al. |
| 2019/0025771 A1 | 1/2019 | Park et al. |
| 2019/0037135 A1 | 1/2019 | Hedge |
| 2019/0042988 A1 | 2/2019 | Brown et al. |
| 2019/0088106 A1 | 3/2019 | Grundstrom |
| 2019/0094824 A1 | 3/2019 | Xie et al. |
| 2019/0095480 A1 | 3/2019 | Park et al. |
| 2019/0095520 A1 | 3/2019 | Park et al. |
| 2019/0096217 A1 | 3/2019 | Pourmohammad et al. |
| 2019/0098113 A1 | 3/2019 | Park et al. |
| 2019/0102840 A1 | 4/2019 | Perl et al. |
| 2019/0138512 A1 | 5/2019 | Pourmohammad et al. |
| 2019/0147883 A1 | 5/2019 | Mellenthin et al. |
| 2019/0158309 A1 | 5/2019 | Park et al. |
| 2019/0163152 A1 | 5/2019 | Worrall et al. |
| 2019/0268178 A1 | 8/2019 | Fairweather et al. |
| 2019/0310979 A1 | 10/2019 | Masuzaki et al. |
| 2020/0226156 A1 | 7/2020 | Borra et al. |
| 2020/0285203 A1 | 9/2020 | Thakur et al. |
| 2021/0042299 A1 | 2/2021 | Migliori |
| 2021/0381711 A1 | 12/2021 | Harvey et al. |
| 2021/0381712 A1 | 12/2021 | Harvey et al. |
| 2021/0382445 A1 | 12/2021 | Harvey et al. |
| 2021/0383041 A1 | 12/2021 | Harvey et al. |
| 2021/0383042 A1 | 12/2021 | Harvey et al. |
| 2021/0383200 A1 | 12/2021 | Harvey et al. |
| 2021/0383219 A1 | 12/2021 | Harvey et al. |
| 2021/0383235 A1 | 12/2021 | Harvey et al. |
| 2021/0383236 A1 | 12/2021 | Harvey et al. |
| 2022/0066402 A1 | 3/2022 | Harvey et al. |
| 2022/0066405 A1 | 3/2022 | Harvey |
| 2022/0066432 A1 | 3/2022 | Harvey et al. |
| 2022/0066434 A1 | 3/2022 | Harvey et al. |
| 2022/0066528 A1 | 3/2022 | Harvey et al. |
| 2022/0066722 A1 | 3/2022 | Harvey et al. |
| 2022/0066754 A1 | 3/2022 | Harvey et al. |
| 2022/0066761 A1 | 3/2022 | Harvey et al. |
| 2022/0067226 A1 | 3/2022 | Harvey et al. |
| 2022/0067227 A1 | 3/2022 | Harvey et al. |
| 2022/0067230 A1 | 3/2022 | Harvey et al. |
| 2022/0069863 A1 | 3/2022 | Harvey et al. |
| 2022/0070293 A1 | 3/2022 | Harvey et al. |
| 2022/0138684 A1 | 5/2022 | Harvey |
| 2022/0215264 A1 | 7/2022 | Harvey et al. |
| 2023/0010757 A1 | 1/2023 | Preciado |

FOREIGN PATENT DOCUMENTS

| | | |
|---|---|---|
| CN | 102136100 A | 7/2011 |
| CN | 102650876 A | 8/2012 |
| CN | 104040583 A | 9/2014 |
| CN | 104603832 A | 5/2015 |
| CN | 104919484 A | 9/2015 |
| CN | 106204392 A | 12/2016 |
| CN | 106406806 A | 2/2017 |
| CN | 106960269 A | 7/2017 |
| CN | 107147639 A1 | 9/2017 |
| CN | 107598928 A | 1/2018 |
| EP | 2 528 033 A1 | 11/2012 |
| EP | 3 324 306 A1 | 5/2018 |
| JP | H10-049552 A | 2/1998 |
| JP | 2003-162573 A | 6/2003 |
| JP | 2007-018322 A | 1/2007 |
| JP | 4073946 B1 | 4/2008 |
| JP | 2008-107930 A | 5/2008 |
| JP | 2013-152618 A | 8/2013 |
| JP | 2014-044457 A | 3/2014 |
| KR | 2016/0102923 A | 8/2016 |
| WO | WO-2009/020158 A1 | 2/2009 |
| WO | WO-2011/100255 A2 | 8/2011 |
| WO | WO-2013/050333 A1 | 4/2013 |
| WO | WO-2015/106702 A1 | 7/2015 |
| WO | WO-2015/145648 A1 | 10/2015 |
| WO | WO-2017/035536 A1 | 3/2017 |
| WO | WO-2017/192422 A1 | 11/2017 |
| WO | WO-2017/194244 A1 | 11/2017 |
| WO | WO-2017/205330 A1 | 11/2017 |
| WO | WO-2017/213918 A1 | 12/2017 |

OTHER PUBLICATIONS

Balaji et al., "Brick: Metadata schema for portable smart building applications," Applied Energy, Sep. 15, 2018, 3 pages, (Abstract).

Balaji et al., "Demo Abstract: Portable Queries Using the Brick Schema for Building Applications," BuildSys '16, Palo Alto, CA, USA, Nov. 16-17, 2016 (2 pages).

Balaji, B et al., "Brick: Towards a Unified Metadata Schema For Buildings." BuildSys '16, Palo Alto, CA, USA, Nov. 16-17, 2016 (10 pages).

Bhattacharya et al., "Short Paper: Analyzing Metadata Schemas for Buildings—The Good, The Bad and The Ugly," BuildSys '15, Seoul, South Korea, Nov. 4-5, 2015 (4 pages).

Bhattacharya, A., "Enabling Scalable Smart-Building Analytics," Electrical Engineering and Computer Sciences, University of California at Berkeley, Technical Report No. UCB/EECS-2016-201, Dec. 15, 2016 (121 pages).

Brick, "Brick Schema: Building Blocks for Smart Buildings," URL: chrome-extension://efaidnbmnnnibpcajpcglclefindmkaj/https://www.memoori.com/wp-content/uploads/2016/06/Brick_Schema_Whitepaper.pdf, Mar. 2019 (17 pages).

Brick, "Brick: Towards a Unified Metadata Schema For Buildings," URL: chrome-extension://efaidnbmnnnibpcajpcglclefindmkaj/https://brickschema.org/papers/Brick_BuildSys_Present ation.pdf, Presented at BuildSys '16, Nov. 2016 (46 pages).

Brick, "Metadata Schema for Buildings," URL: https://brickschema.org/docs/Brick-Leaflet.pdf, retrieved from internet Dec. 24, 2019 (3 pages).

(56) References Cited

OTHER PUBLICATIONS

Chinese Office Action on CN Appl. No. 201780003995.9 dated Apr. 8, 2021 (21 pages with English language translation).
Chinese Office action on CN Appl. No. 201780043400.2 dated Apr. 25, 2021 (15 pages with English language translation).
Curry, E. et al., "Linking building data in the cloud: Integrating cross-domain building data using linked data." Advanced Engineering Informatics, 2013, 27 (pp. 206-219).
Digital Platform Litigation Documents Part 1, includes cover letter, dismissal of case DDE-1-21-cv-01796, IPR2023-00022 (documents filed Jan. 26, 2023-Oct. 7, 2022), and IPR2023-00085 (documents filed Jan. 26, 2023-Oct. 20, 2022) (748 pages total).
Digital Platform Litigation Documents Part 10, includes DDE-1-21-cv-01796 (documents filed Nov. 1, 2022, Dec. 22, 2021 (1795 pages total).
Digital Platform Litigation Documents Part 2, includes IPR2023-00085 (documents filed Oct. 20, 2022) (172 pages total).
Digital Platform Litigation Documents Part 3, includes IPR2023-00085 (documents filed Oct. 20, 2022) and IPR2023-00170 (documents filed Nov. 28, 2022-Nov. 7, 2022) (397 pages total).
Digital Platform Litigation Documents Part 4, includes IPR2023-00170 (documents filed Nov. 7, 2022) and IPR2023-00217 (documents filed Jan. 18, 2023-Nov. 15, 2022) (434 pages total).
Digital Platform Litigation Documents Part 5, includes IPR2023-00217 (documents filed Nov. 15, 2022) and IPR2023-00257 (documents filed Jan. 25, 2023-Nov. 23, 2022) (316 pages total).
Digital Platform Litigation Documents Part 6, includes IPR2023-00257 (documents filed Nov. 23, 2022) and IPR 2023-00346 (documents filed Jan. 3, 2023-Dec. 13, 2022) (295 pages total).
Digital Platform Litigation Documents Part 7, includes IPR 2023-00346 (documents filed Dec. 13, 2022) and IPR2023-00347 (documents filed Jan. 3, 2023-Dec. 13, 2022) (217 pages total).
Digital Platform Litigation Documents Part 8, includes IPR2023-00347 (documents filed Dec. 13, 2022), EDTX-2-22-cv-00243 (documents filed Sep. 20, 2022-Jun. 29, 2022), and DDE-1-21-cv-01796 (documents filed Feb. 3, 2023-Jan. 10, 2023 (480 pages total).
Digital Platform Litigation Documents Part 9, includes DDE-1-21-cv-01796 (documents filed Jan. 10, 2023-Nov. 1, 2022 (203 pages total).
El Kaed, C. et al., "Building management insights driven by a multi-system semantic representation approach," 2016 IEEE 3rd World Forum on Internet of Things (WF-IoT), Dec. 12-14, 2016, (pp. 520-525).
Ellis, C. et al., "Creating a room connectivity graph of a building from per-room sensor units." BuildSys '12, Toronto, ON, Canada, Nov. 6, 2012 (7 pages).
Extended European Search Report on EP Application No. 18196948.6 dated Apr. 10, 2019 (9 pages).
Fierro et al., "Beyond a House of Sticks: Formalizing Metadata Tags with Brick," BuildSys '19, New York, NY, USA, Nov. 13-14, 2019 (10 pages).
Fierro et al., "Dataset: An Open Dataset and Collection Tool for BMS Point Labels," DATA'19, New York, NY, USA, Nov. 10, 2019 (3 pages).
Fierro et al., "Design and Analysis of a Query Processor for Brick," ACM Transactions on Sensor Networks, Jan. 2018, vol. 1, No. 1, art. 1 (25 pages).
Fierro et al., "Design and Analysis of a Query Processor for Brick," BuildSys '17, Delft, Netherlands, Nov. 8-9, 2017 (10 pages).
Fierro et al., "Mortar: An Open Testbed for Portable Building Analytics," BuildSys '18, Shenzhen, China, Nov. 7-8, 2018 (10 pages).
Fierro et al., "Why Brick is a Game Changer for Smart Buildings," URL: https://brickschema.org/papers/Brick_Memoori_Webinar_Presentation.pdf, Memoori Webinar, 2019 (67 pages).
Fierro, "Writing Portable Building Analytics with the Brick Metadata Schema," UC Berkeley, ACM E-Energy, 2019 (39 pages).
Fierro, G., "Design of an Effective Ontology and Query Processor Enabling Portable Building Applications," Electrical Engineering and Computer Sciences, University of California at Berkeley, Technical Report No. UCB/EECS-2019-106, Jun. 27, 2019 (118 pages).
File History for U.S. Appl. No. 12/776,159, filed May 7, 2010 (722 pages).
Final Conference Program, ACM BuildSys 2016, Stanford, CA, USA, Nov. 15-17, 2016 (7 pages).
Gao et al., "A large-scale evaluation of automated metadata inference approaches on sensors from air handling units," Advanced Engineering Informatics, 2018, 37 (pp. 14-30).
Harvey, T., "Quantum Part 3: The Tools of Autonomy, How PassiveLogic's Quantum Creator and Autonomy Studio software works," URL: https://www.automatedbuildings.com/news/jan22/articles/passive/211224010000passive.html, Jan. 2022 (7 pages).
Harvey, T., "Quantum: The Digital Twin Standard for Buildings," URL: https://www.automatedbuildings.com/news/feb21/articles/passivelogic/210127124501passivelogic.html, Feb. 2021 (6 pages).
Hu, S. et al., "Building performance optimisation: A hybrid architecture for the integration of contextual information and time-series data," Automation in Construction, 2016, 70 (pp. 51-61).
International Search Report and Written Opinion for PCT Appl. Ser. No. PCT/US2017/013831 dated Mar. 31, 2017 (14 pages).
International Search Report and Written Opinion for PCT Appl. Ser. No. PCT/US2017/035524 dated Jul. 24, 2017 (14 pages).
International Search Report and Written Opinion on PCT/US2017/052060, dated Oct. 5, 2017, 11 pages.
International Search Report and Written Opinion on PCT/US2017/052633, dated Oct. 23, 2017, 9 pages.
International Search Report and Written Opinion on PCT/US2017/052829, dated Nov. 27, 2017, 24 pages.
International Search Report and Written Opinion on PCT/US2018/024068, dated Jun. 15, 2018, 22 pages.
International Search Report and Written Opinion on PCT/US2018/052971, dated Mar. 1, 2019, 19 pages.
International Search Report and Written Opinion on PCT/US2018/052974, dated Dec. 19, 2018, 13 pages.
International Search Report and Written Opinion on PCT/US2018/052975, dated Jan. 2, 2019, 13 pages.
International Search Report and Written Opinion on PCT/US2018/052994, dated Jan. 7, 2019, 15 pages.
International Search Report and Written Opinion on PCT/US2019/015481, dated May 17, 2019, 78 pages.
International Search Report and Written Opinion on PCT/US2020/058381, dated Jan. 27, 2021, 30 pages.
Japanese Office Action on JP Appl. No. 2018-534963 dated May 11, 2021 (16 pages with English language translation).
Koh et al., "Plaster: An Integration, Benchmark, and Development Framework for Metadata Normalization Methods," BuildSys '18, Shenzhen, China, Nov. 7-8, 2018 (10 pages).
Koh et al., "Scrabble: Transferrable Semi-Automated Semantic Metadata Normalization using Intermediate Representation," BuildSys '18, Shenzhen, China, Nov. 7-8, 2018 (10 pages).
Koh et al., "Who can Access What, and When?" BuildSys '19, New York, NY, USA, Nov. 13-14, 2019 (4 pages).
Li et al., "Event Stream Processing with Out-of-Order Data Arrival," International Conferences on Distributed Computing Systems, 2007, (8 pages).
Nissin Electric Co., Ltd., "Smart power supply system (SPSS)," Outline of the scale verification plan, Nissin Electric Technical Report, Japan, Apr. 23, 2014, vol. 59, No. 1 (23 pages).
Passivelogic, "Explorer: Digital Twin Standard for Autonomous Systems. Made interactive." URL: https://passivelogic.com/software/quantum-explorer/, retrieved from internet Jan. 4, 2023 (13 pages).
Passivelogic, "Quantum: The Digital Twin Standard for Autonomous Systems, A physics-based ontology for next-generation control and AI." URL: https://passivelogic.com/software/quantum-standard/, retrieved from internet Jan. 4, 2023 (20 pages).
Quantum Alliance, "Quantum Explorer Walkthrough," 2022, (7 pages) (screenshots from video).
Results of the Partial International Search for PCT/US2018/052971, dated Jan. 3, 2019, 3 pages.

(56) References Cited

OTHER PUBLICATIONS

Sinha, Sudhi and Al Huraimel, Khaled, "Reimagining Businesses with AI" John Wiley & Sons, Inc., Hoboken, NJ, USA, 2021 (156 pages).

Sinha, Sudhi R. and Park, Youngchoon, "Building an Effective IoT Ecosystem for Your Business," Johnson Controls International, Springer International Publishing, 2017 (286 pages).

Sinha, Sudhi, "Making Big Data Work For Your Business: A guide to effective Big Data analytics," Impackt Publishing Ltd., Birmingham, UK, Oct. 2014 (170 pages).

The Virtual Nuclear Tourist, "Calvert Cliffs Nuclear Power Plant," URL: http://www.nucleartourist.com/us/calvert.htm, Jan. 11, 2006 (2 pages).

University of California At Berkeley, EECS Department, "Enabling Scalable Smart-Building Analytics," URL: https://www2.eecs.berkeley.edu/Pubs/TechRpts/2016/EECS-2016-201.html, retrieved from internet Feb. 15, 2022 (7 pages).

Van Hoof, Bert, "Announcing Azure Digital Twins: Create digital replicas of spaces and infrastructure using cloud, AI and IoT," URL: https://azure.microsoft.com/en-us/blog/announcing-azure-digital-twins-create-digital-replicas-of-spaces-and-infrastructure-using-cloud-ai-and-iot/, Sep. 24, 2018 (11 pages).

W3c, "Sparql: Query Language for RDF," located on The Wayback Machine, URL: https://web.archive.org/web/20161230061728/http://www.w3.org/TR/rdf-sparql-query/), retrieved from internet Nov. 15, 2022 (89 pages).

Wei et al., "Development and Implementation of Software Gateways of Fire Fighting Subsystem Running on EBI," Control, Automation and Systems Engineering, IITA International Conference on, IEEE, Jul. 2009 (pp. 9-12).

Zhou, Q. et al., "Knowledge-infused and Consistent Complex Event Processing over Real-time and Persistent Streams," Further Generation Computer Systems, 2017, 76 (pp. 391-406).

\* cited by examiner

BUILDING CAMPUS WITH INTEGRATED SMART ENVIRONMENT

CROSS-REFERENCE TO RELATED PATENT APPLICATIONS

This application is a continuation of U.S. patent application Ser. No. 16/198,696 filed Nov. 21, 2018 which claims the benefit of and priority to U.S. Provisional Patent Application No. 62/590,167 filed Nov. 22, 2017, the entire disclosure of each of these patent applications are incorporated by reference herein.

BACKGROUND

The present disclosure relates generally to building management. The present disclosure relates more particularly to systems and methods for creating a highly-personalized and software-defined building management environment.

A building management system (BMS) is, in general, a system of devices configured to control, monitor, and manage equipment in or around a building or building area. A BMS can include a heating, ventilation, and air conditioning (HVAC) system, a security system, a lighting system, a fire alerting system, another system that is capable of managing building functions or devices, or any combination thereof. BMS devices may be installed in any environment (e.g., an indoor area or an outdoor area) and the environment may include any number of buildings, spaces, zones, rooms, or areas. A BMS may include a variety of devices (e.g., HVAC devices, controllers, chillers, fans, sensors, etc.) configured to facilitate monitoring and controlling the building space.

Currently, the building automation industry has many opportunities and promise for growth. However, many technological advancements have been made in recent years that the Building Management System (BAS) industry has not fully leveraged. Consequently, the BMS industry is still using old control technologies, engineering practices and data exchange standards. There remains a desire for a more robust and flexible building management system design.

SUMMARY

One implementation of the present disclosure is a system for providing frictionless access control in a building. The system includes an access control device configured to obtain identity information related to an individual and an access point in the building, wherein the individual seeks authorization to enter the access point. The system further includes a cloud computing system configured to maintain a directory of individuals associated with the building, receive the identity information from the access control device, identify the individual by comparing the identity information to the directory, send an authorization request to the user device, and authorize the individual to enter the access point upon completion of the authorization request.

In some embodiments, the access control device is an iris recognition device, a camera, a fingerprint reader, or a card reader.

In some embodiments, the identity information is information related to a fingerprint, a facial recognition process, an iris scan, a card read, or the user device.

In some embodiments, the authorization request is a request related to a passcode, a facial recognition process, an iris scan, a fingerprint, or a text message.

In some embodiments, the user device is a smartphone, a tablet, a laptop, a wearable device, or a vehicle.

In some embodiments, they system further includes one or more additional access control devices configured to obtain additional identity information used by the cloud computing system to authorize the individual to enter the access point.

In some embodiments, the access point is a door, a turnstile, a parking gate, or an elevator.

Another implementation of the present disclosure is a method for providing frictionless access control in a building. The method includes maintaining a directory of individuals associated with the building, receiving identity information related to an individual seeking authorization to enter an access point in the building from at least one access control device, identifying the individual by comparing the identity information to the directory, identifying a user device associated with the individual using the directory, sending an authorization request to the user device, and authorizing the individual to enter the access point upon completion of the authorization request.

In some embodiments, authorizing the individual to enter the access point includes opening a door, a turnstile, a parking gate, or an elevator.

In some embodiments, the at least one access control device is an iris recognition device, a camera, a fingerprint reader, or a card reader.

In some embodiments, receiving the identity information includes receiving information related to a fingerprint, a facial recognition process, an iris scan, a card read, or the user device.

In some embodiments, sending the authorization request to the user device includes sending a request related to a passcode, a facial recognition process, an iris scan, a fingerprint, or a text message.

In some embodiments, the user device is a smartphone, a tablet, a laptop, a wearable device, or a vehicle.

Yet another implementation of the present disclosure is a system for providing device management services for a building. The system includes a first device produced by a first manufacturer and a second device produced by a second manufacturer. The system further includes a cloud computing system configured to provide a first token to the first device, provide a second token to the second device, register the first device and the second device to a directory associated with the building using the first token and the second token, and authorize one or more users associated with the building to access and modify parameters associated with the first device and the second device through the directory.

In some embodiments, the first device and the second device are a sensor, a controller, an iris recognition device, a camera, a fingerprint reader, or a card reader.

In some embodiments, the cloud computing system is further configured to provide compliance reporting related to each device in the directory.

In some embodiments, the cloud computing system is further configured to authorize a software application to access and modify parameters associated with the first device or the second device.

In some embodiments, the cloud computing system is further configured to maintain warranty information related to each device in the directory.

In some embodiments, the cloud computing system is further configured to manage authorization relationships between owners, service providers, original equipment manufacturers, and other users.

In some embodiments, the cloud computing platform is further configured to register the first device and the second device to the directory by adding the first device and the second device to a blockchain.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

Some embodiments will become more fully understood from the following detailed description, taken in conjunction with the accompanying drawings, wherein like reference numerals refer to like elements, in which.

DETAILED DESCRIPTION

Overview

Referring generally to the FIGURES, systems and methods for creating a smart environment for a building campus are shown, according to various exemplary embodiments. The smart environment can include a software-defined, data-rich, and cloud-based computing platform that can perform a wide variety of functions. Data associated with this computing platform can be mostly or entirely hosted in the cloud as opposed to being hosted in multiple locations. Moreover, plug and play functionality and robust APIs facilitate the ability to develop a variety of applications that utilize and leverage data associated with the computing platform. The system design described herein may provide distinct advantages over previous approaches such as improved scalability, lower cost of maintenance, reduced setup and commissioning time, reduced cost of operating a building campus, and reduced energy consumption, to name some examples.

Building Management System and HVAC System

Figure 1:
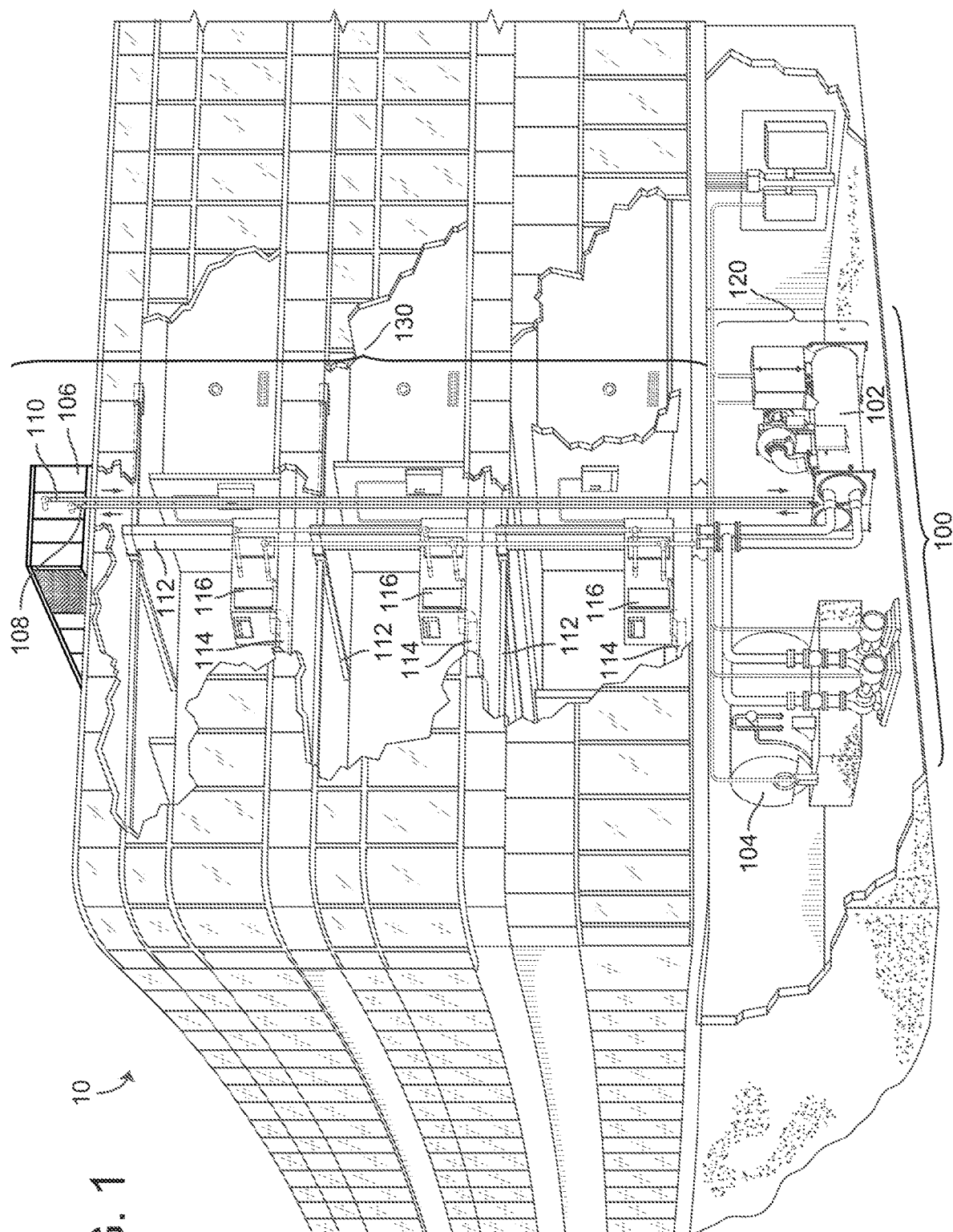
FIG. 1 is a drawing of a building equipped with a HVAC system, according to some embodiments.

Referring now to FIGS. 1-4, an exemplary building management system (BMS) and HVAC system in which the systems and methods of the present invention may be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, an HVAC system, a security system, a lighting system, a fire alerting system, or any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils).

The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
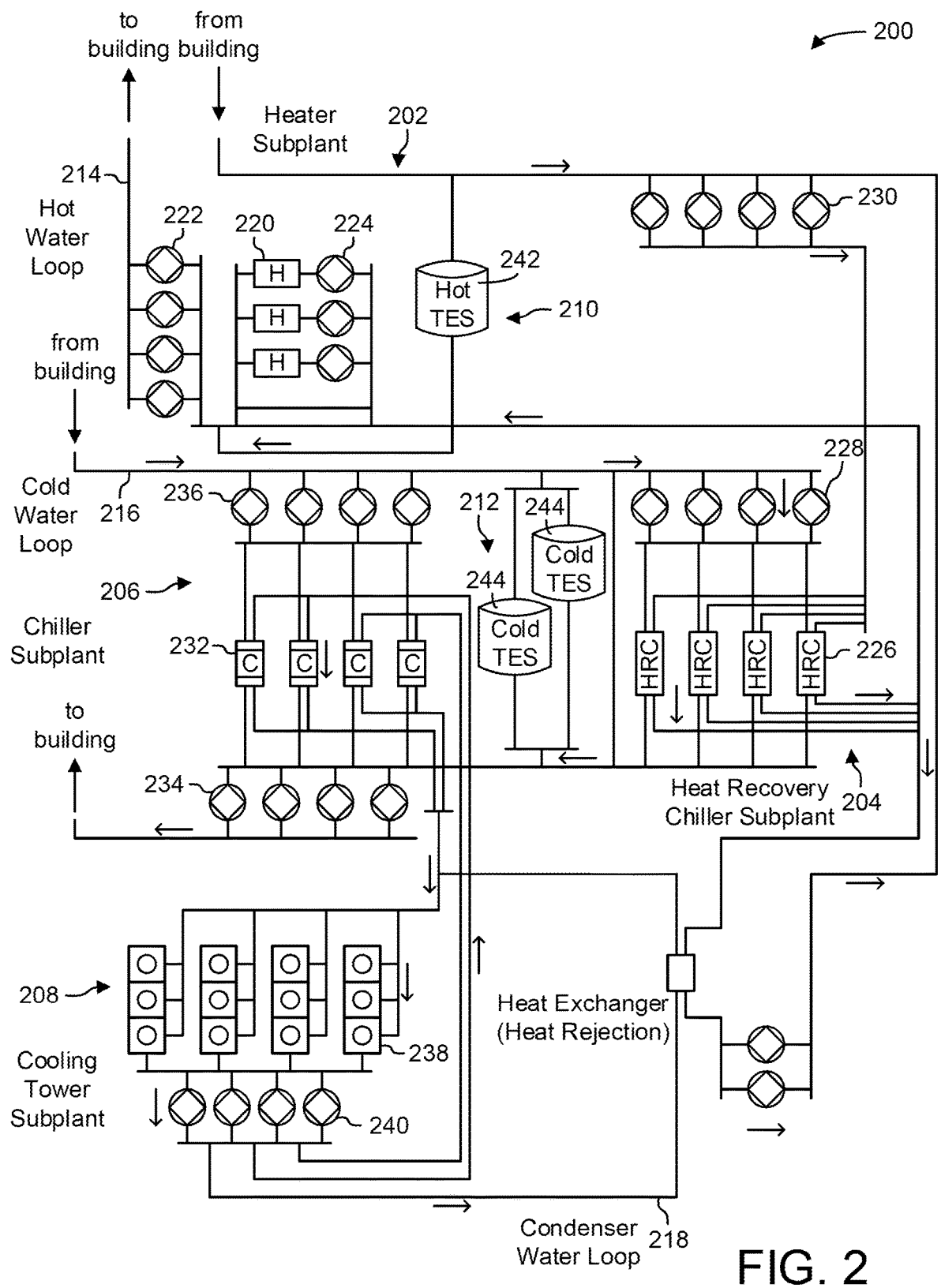
FIG. 2 is a block diagram of a waterside system that may be used in conjunction with the building of FIG. 1, according to some embodiments.

Referring now to FIG. 2, a block diagram of a waterside system 200 is shown, according to one embodiment. In various embodiments, waterside system 200 may supplement or replace waterside system 120 in HVAC system 100 or may be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 may be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between the chiller subplant 206 and the building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
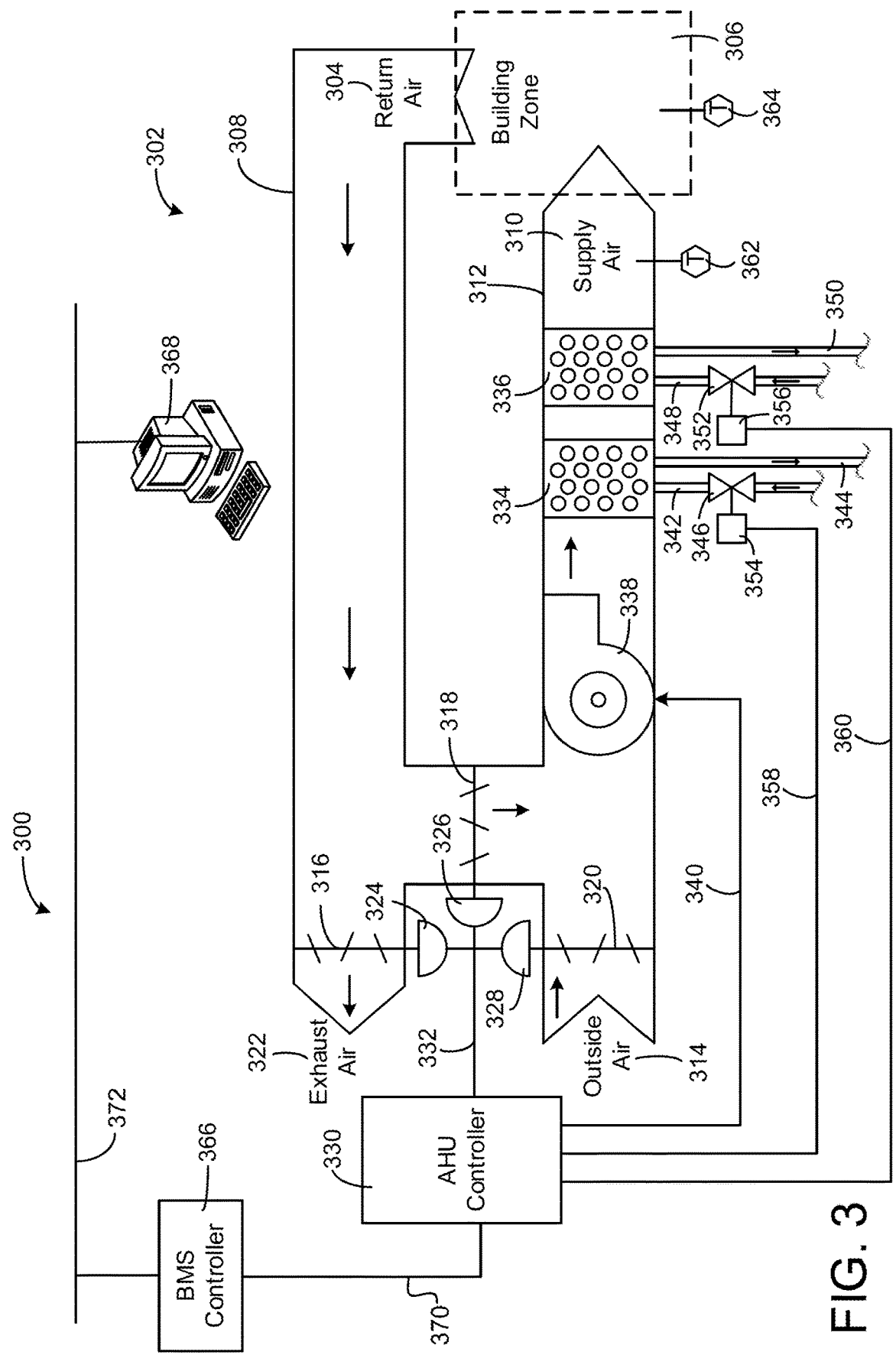
FIG. 3 is a block diagram of an airside system that may be used in conjunction with the building of FIG. 1, according to some embodiments.

Referring now to FIG. 3, a block diagram of an airside system 300 is shown, according to an exemplary embodiment. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 3) or integrated. In an integrated implementation, AHU controller 330 may be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
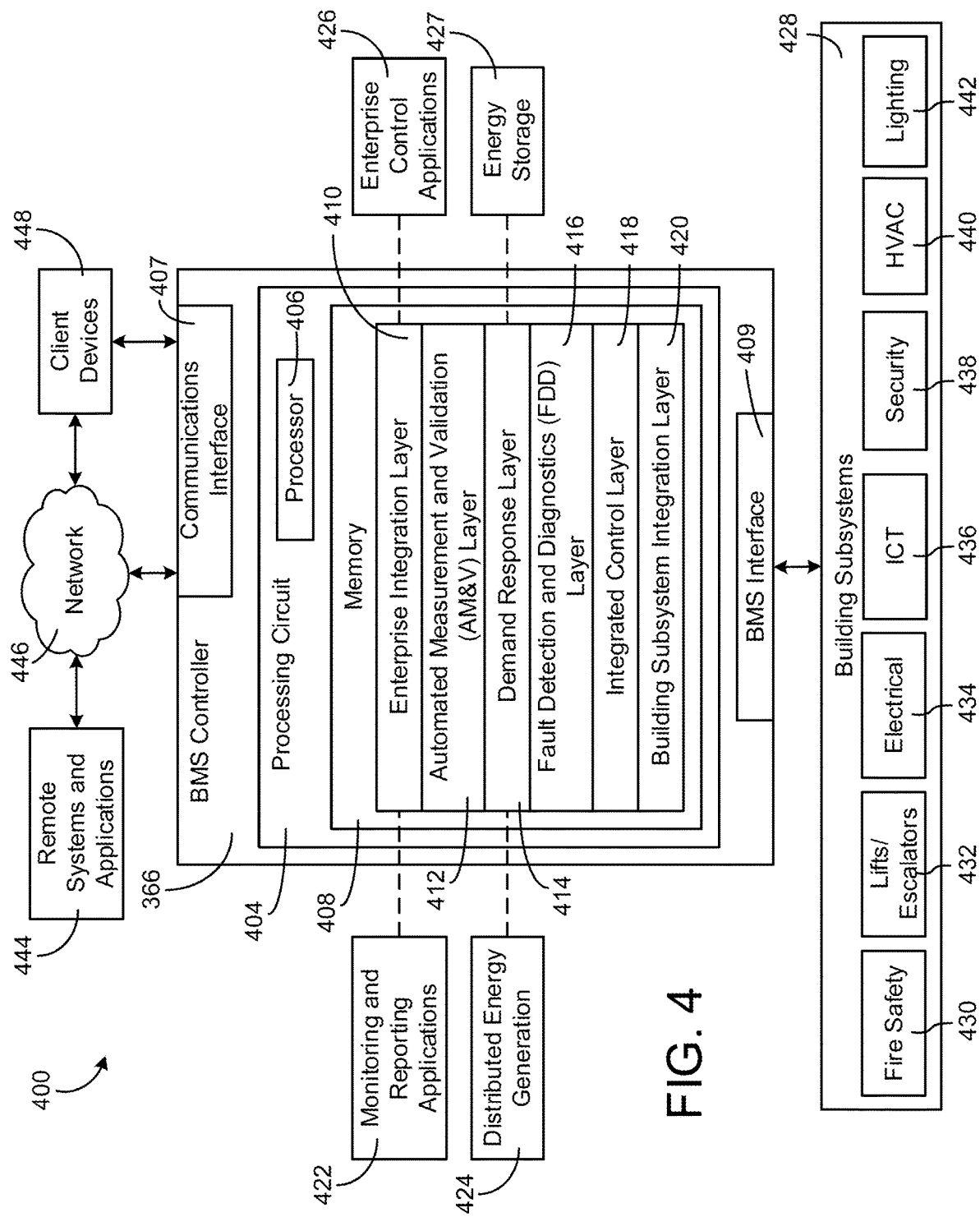
FIG. 4 is a block diagram of a building management system (BMS) that may be used to monitor and/or control the building of FIG. 1, according to some embodiments.

Referring now to FIG. 4, a block diagram of a building management system (BMS) 400 is shown, according to an exemplary embodiment. BMS 400 may be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 may be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 may be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, flash memory, hard disk storage, etc.) for storing data and/or computer code for completing or facilitating the various processes, layers and modules described in the present application. Memory 408 may be or include volatile memory or non-volatile memory. Memory 408 may include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 may be distributed across multiple servers or computers (e.g., that can exist in distributed locations). Further, while FIG. 4 shows applications 422 and 426 as existing outside of BMS controller 366, in some embodiments, applications 422 and 426 may be hosted within BMS controller 366 (e.g., within memory 408).

Still referring to FIG. 4, memory 408 is shown to include an enterprise integration layer 410, an automated measurement and validation (AM & V) layer 412, a demand response (DR) layer 414, a fault detection and diagnostics (FDD) layer 416, an integrated control layer 418, and a building subsystem integration layer 420. Layers 410-420 may be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 may be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML, files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions can specify which equipment may be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 may be configured to use the data input or output of building subsystem integration layer 420 and/or demand response layer 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 may be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 may be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 may be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 may be configured to provide calculated inputs (e.g., aggregations) to these higher levels based on outputs from more than one building subsystem.

Automated measurement and validation (AM & V) layer 412 may be configured to verify that control strategies commanded by integrated control layer 418 or demand response layer 414 are working properly (e.g., using data aggregated by AM & V layer 412, integrated control layer 418, building subsystem integration layer 420, FDD layer 416, or otherwise). The calculations made by AM & V layer 412 may be based on building system energy models and/or equipment models for individual BMS devices or subsystems. For example, AM & V layer 412 may compare a model-predicted output with an actual output from building subsystems 428 to determine an accuracy of the model.

Fault detection and diagnostics (FDD) layer 416 may be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 may be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) may shut-down systems or direct control activities around faulty devices or systems to reduce energy waste, extend equipment life, or assure proper control response.

FDD layer 416 may be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Building Campus with Integrated Smart Environment

Figure 5:
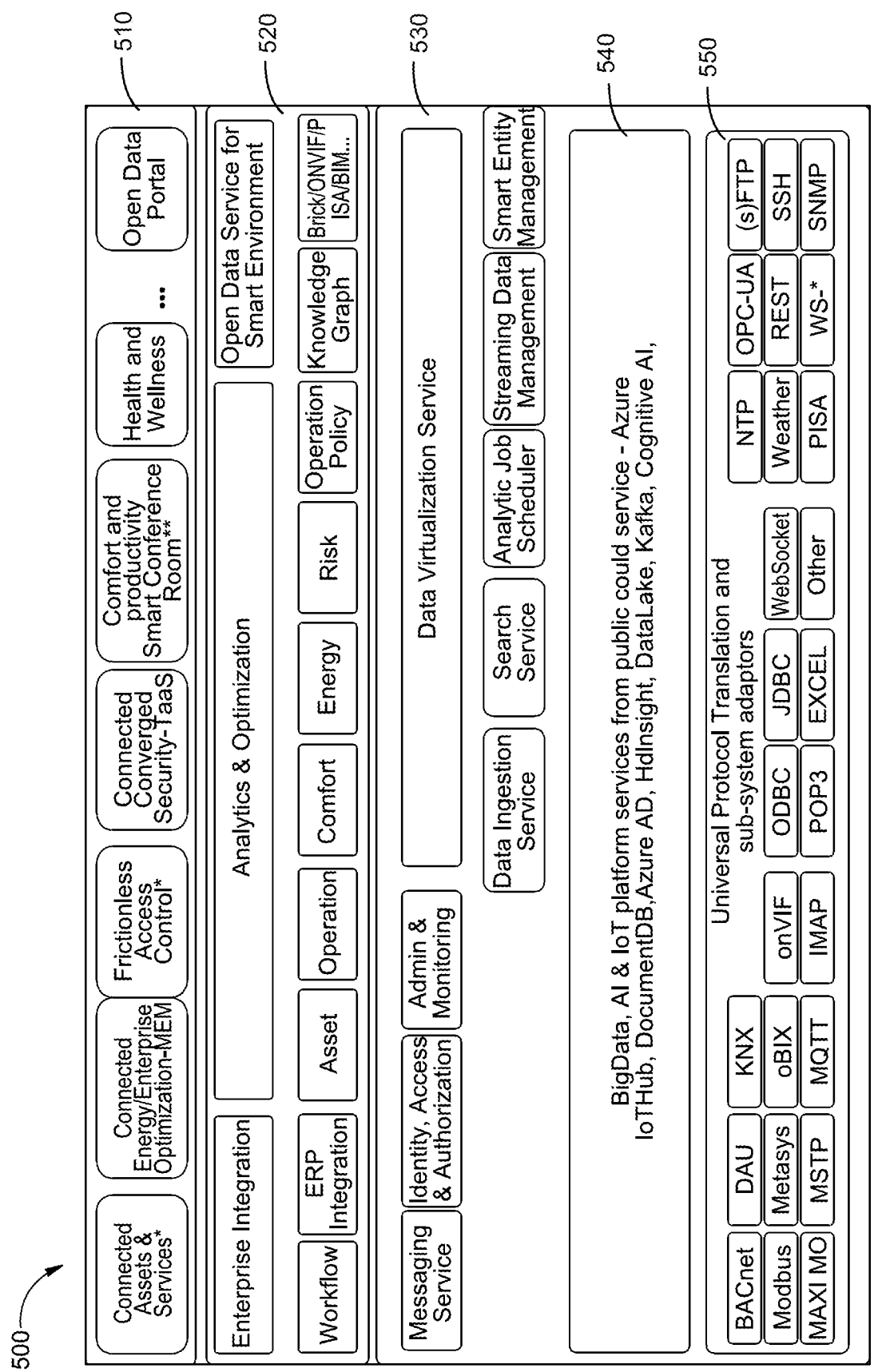
FIG. 5 is a block diagram of an integrated computing platform for a smart building environment, according to some embodiments.

Turning to FIG. 5, a block diagram showing components of an integrated computing platform 500 for facilitating a smart building environment is shown, according to an exemplary embodiment. Platform 500 can be used to integrate technology, people, data, and devices associated with the smart environment. Platform 500 can leverage an open source ecosystem to allow for rapid application development and analytics. Platform 500 can also support standards-based data modeling, transformation, integration, management, analysis, and process automation for the smart environment. Further, platform 500 can implement robust data ingestion as a service in order to support a wide variety of data originating from sensors, devices, and ERP systems to build any type of use cases such as user management and space utilization.

The smart environment facilitated by platform 500 can achieve plug and play data acquisition and integration. Computation and analytics can occur autonomously in order to provide globally optimized operating decisions. Causality analysis of events, prediction of risks, and operating decisions can be made in a matter of seconds or minutes instead of days or weeks. In some embodiments, artificial intelligence, big data, and Internet of Things (IoT) facilitates an improved experience for every person involved in the smart environment. Platform 500 can generally be viewed as a cloud computing system.

Upon implementation of platform 500, a building campus can be viewed as a data access environment that allows for collection and open access to real-time and historical data from a variety of integrated systems. A building campus can also be viewed as a data-analytics platform that provides users with the ability to analyze and improve overall operational efficiencies. The smart environment can facilitate continuous data-driven innovation through the development of common data models and shared semantics for devices and systems. Plug and play support can be achieved at device, system, and application levels. Communication to and from all connected building systems can occur via common protocols and can be used to exchange, monitor, and override data. The smart environment can include unified and consolidated services for graphics, trending, reporting, scheduling, data storage, analysis, management functions, and governance to name some examples. All levels of integration interfaces can be defined in order to ensure scalability and the correct governance of all data flow. Platform 500 can include an open data access layer that can share data with enterprise applications, business areas, and users. Platform 500 can also allow for the design and implementation of unified identity and access control, authentication and authorization of users, organization, and devices. Support for operational optimization can be achieved by providing integration tools and technology used to demonstrate improved asset uptime, utilization, and predictive maintenance, for example.

A smart environment for a building campus can include a variety of IoT-enabled devices and systems. For example, devices may include meters (e.g., electrical, water, gas), fans, hydraulics, fire/smoke detectors, audio/visual systems, intrusion systems, lighting, HVAC, refrigeration, elevators, sensors (e.g., humidity, occupancy), communication systems (e.g., Intercom), electric vehicle charging, mobile devices, personal computing devices, and kitchen appliances to name some examples. The smart environment can also include integration of access control systems, multi-sensory surveillance systems, renewable energy storage systems, emergency power backup, building automation systems, enterprise resource planning tools (e.g., human resource, capital planning, facility management), security and risk management tools, and office automation and collaboration tools to name some more examples. The integration and interconnection of a variety of devices and systems along with associated data can improve the experience of every person involved.

Platform 500 is shown to include an application layer 510. A variety of different applications related to asset management, energy optimization, access control, security services, comfort and productivity, conference room scheduling, health and wellness, and general data modeling can all be built on top of platform 500. The use of common data models and semantics as well as the volume of data available within platform 500 facilitates robust application development within the smart building environment.

Platform 500 is also shown to include a business layer 520. Layer 520 supports customization of various parameters and logic specific to a business or other entity that uses platform 500 to create a smart building environment. For example, an office building may have different preferences and priorities than a manufacturing plant, and layer 520 allows each of these entities to tailor platform 500 to better suit their needs. Businesses can integrate various systems such as enterprise resource planning systems into platform 500. Businesses can also define custom analytics and energy optimization logic.

Platform 500 is also shown to include a services layer 530. In some embodiments, the services in layer 530 are built using a microservices development technique such that each service is lightweight and independently scalable. For example, platform 500 can include identity, access, and authorization services. These services can be the center of managing security authorization and access control of all users, applications, services, resources, and connected devices within the smart environment. These services may use a variety of systems and protocols and can be configured to manage tokens used for authorization and authentication. Platform 500 can also include messaging services that can serve as the heart of real-time data integration within the smart environment. These services can allow platform 500 to support a variety of data adaptors, security service integration at various levels of messaging abstractions, dynamic routing, guaranteed delivery, and extensibility.

Services layer 530 can also include a universal protocol translation and enterprise data integration service that can provide unified data ingestion, transformation, and enrichment into a repository (e.g., entity and time series data storage of platform 500). A flow-based, processing-driven approach can achieve improved flexibility, manageability, scalability, and extensibility. Platform 500 can be used with different integration systems based on application and customer needs. The data ingestion service provided by platform 500 can provide distinct phases of data loading practices such as data source and schema registration, one-time batch data loading, continuous data ingestions, and schema transformation. Data sources and schemas can be registered into a typed entity storage system that serves as a schema registry and data catalog. The schema registry service can return a unique schema identifier for future use. A data ingestion service may give an entity storage service performance hints to help the entity storage service select an appropriate underlying data storage system. Any authorized data source can push data to an object ingestion service of platform 500. The object ingestion service can then add associated meta-data that can be either customized or set to a default.

Services layer 530 can also include data virtualization services that can be configured to enrich data with meaningful and configurable relationships. This service can manage two key characteristics of data: the shape (e.g., schema, entity, model) and the semantics. The data visualization services can enable system integrators to define data sources as well as enable data model transformation without the need for storage concerns. As a result, virtually no database programming or administration is required in building system integration. Services and APIs can be provided in order to simplify data shaping and semantic management for third party developers and integrators. The data virtualization can support (e.g., via entity service) semantic and syntactic relationship description between entities and entity types. These relationships can be standardized within platform 500 so that all applications will share the same semantics.

Figure 8:
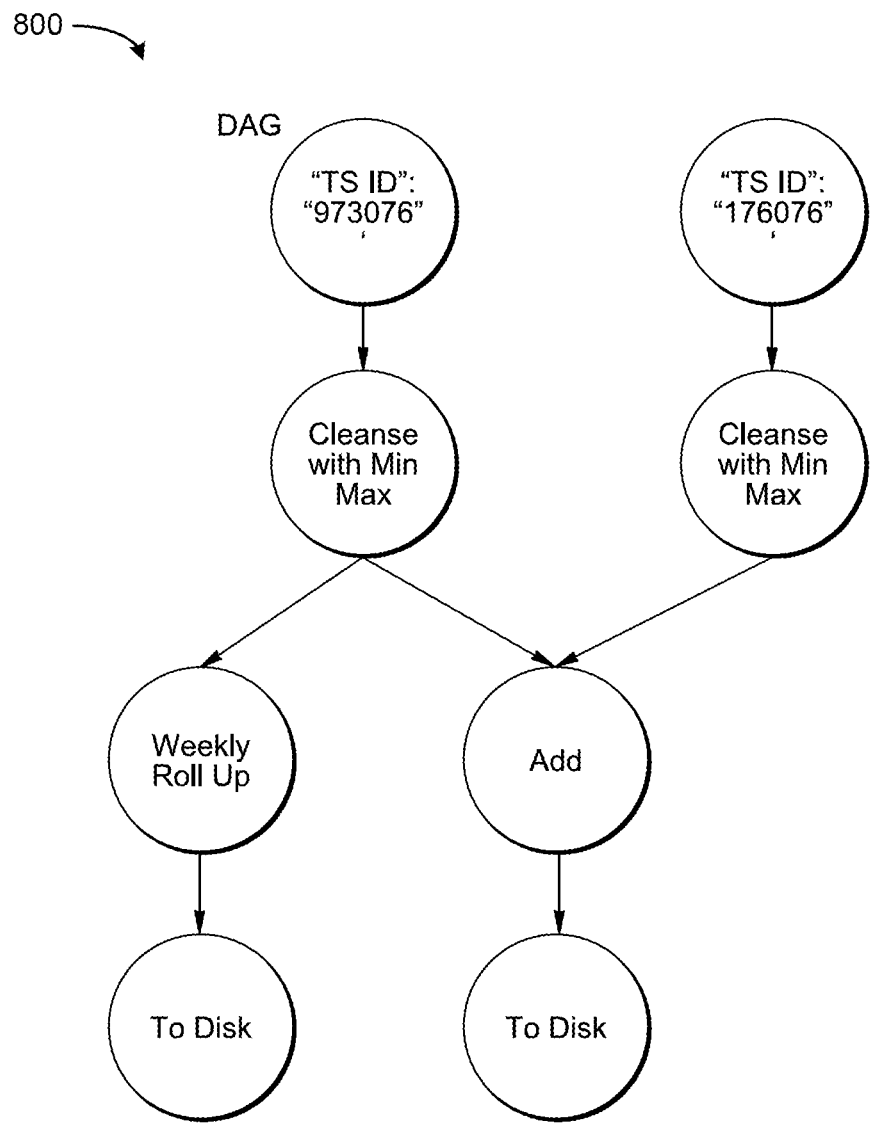
FIG. 8 is an illustration of a directed acyclic graph associated with the platform of FIG. 5, according to some embodiments.

Services layer 530 can also include analytics services which provide a computational framework to perform automated machine learning tasks and analytics. The analytics services may provide a rich set of optimization and forecasting functions that can be run over data (e.g., when new data arrives) in order to automatically provide results. The results from the analytics services can be easily viewed by users in order to deliver increased awareness of a variety of parameters within the smart building environment. The analytics services may include an execution layer which can use directed acyclic graphs (DAGs) (e.g., parse tree format) to represent data flow. The execution layer can be configured to stitch graphs together into larger graphs as well as support user-defined functions and aggregates. In some embodiments, declarative views must be defined before a user may query on it. The use of DAGs provides an alternative to a formal programming language that is simple enough to edit but also structured enough to symbolically manipulate (e.g., graphical drag and drop flow editor). An example of a DAG 800 is shown in FIG. 8.

Platform 500 is also shown to include a third party big data, AI, and IoT services layer 540. For example, platform 500 can utilize cloud services offered by a variety of third party providers. For example, platform 500 may use third party resources such as Microsoft Azure. Platform 500 can be configured to simplify the integration of such eco-system components and provide abstraction APIs to reduce development time for integrated services and applications.

Platform 500 is shown to include a universal protocol and ERP system adapter layer 550 that can enable various protocol translation and device software development kits to ingest data into platform 500. These adapters may use plug-in architecture to add new protocols without reployment of an entire data integration framework. Relevant protocols may include, for example, HTTP(s), SQL, ODBC, ONVIF, PISA, SCADA, REST, BACnet, OPC-US, Metasys ADS/ADX, SQL, smart meters, Modbus, DALI, weather data, and physical access control systems.

Figure 6:
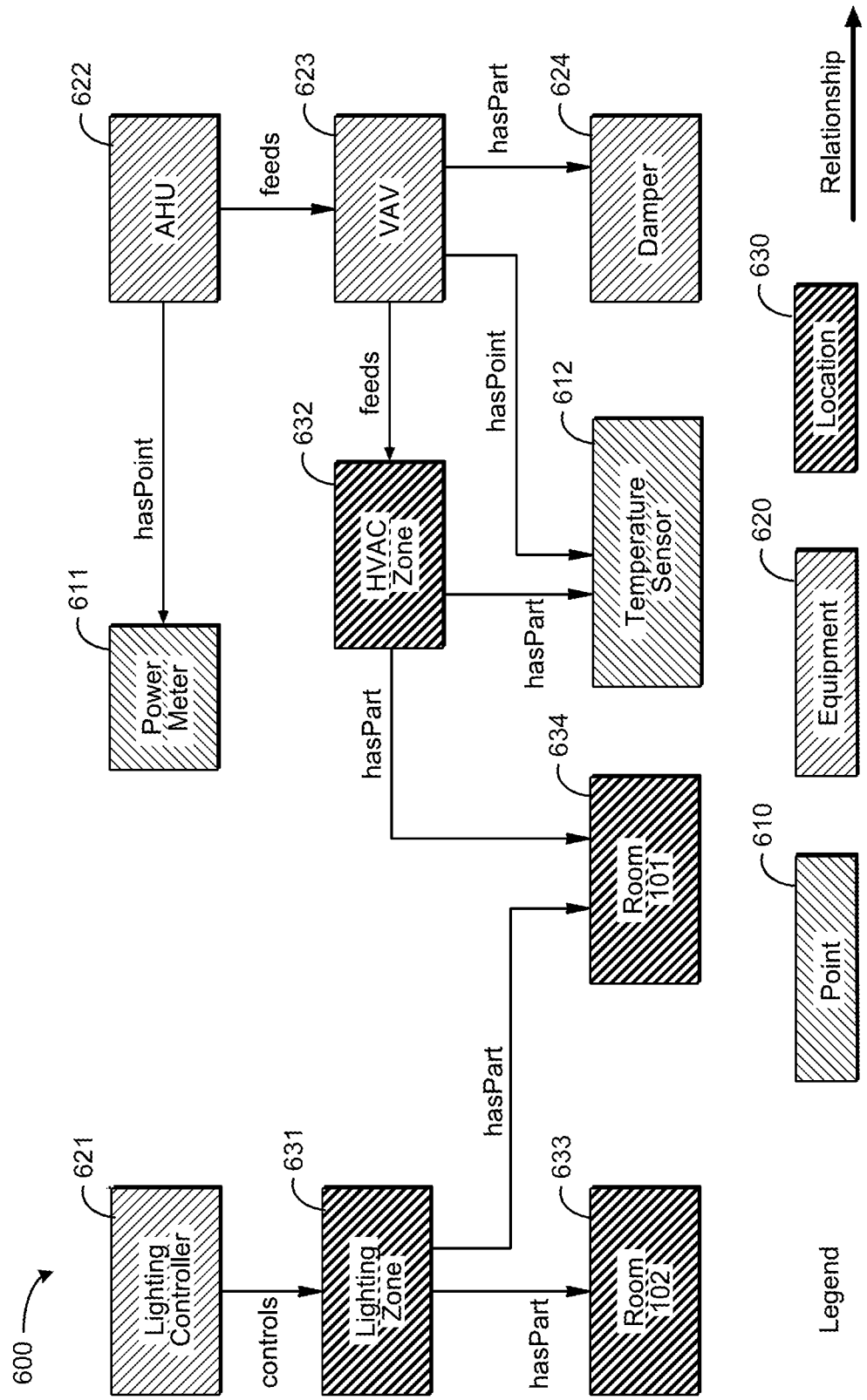
FIG. 6 is a block diagram illustrating relationships used by the platform of FIG. 5, according to some embodiments.

Turning to FIG. 6, a block diagram 600 of location, equipment, and point relationships within platform 500 is shown, according to an exemplary embodiment. These relationships can provide context for a variety of applications. For example, an HVAC fault detection application can benefit from knowing which room a temperature sensor is located in, the corresponding temperature setpoint, and the VAV that provides conditioned air to the room. As shown in diagram 600, such relationships can be defined by connections between points 610, equipment 620, and locations 630. For example, a lighting controller 621 controls a lighting zone 631, and lighting zone 631 is shown to include two parts: room 633 and room 634. Moreover, an air handling unit 622 may have an associated power meter 611 and may feed a variable air volume unit 623. VAV 623 may feed HVAC zone 632, which includes room 634 as well as a temperature sensor 612. VAV 623 may also include a damper 624.

The relationship-based approach shown in diagram 600 can simplify machine learning to deduce or infer the cause of problems, for example. In contrast to a tag-based approach, the relationship-driven expression can connect different entities in the building and can be essential to provide adequate context for a variety of applications. In some embodiments, platform 500 includes a smart entity service which allows users to define new entities, possibly by extending existing entities. Smart entities are described in greater detail in U.S. patent application Ser. No. 16/142,906 filed Sep. 26, 2018, U.S. patent application Ser. No. 16/143,164 filed Sep. 26, 2018, and Ser. No. 16/142,859 filed Sep. 26, 2018. The entire disclosure of each of these patent applications is incorporated by reference herein.

Figure 7A:
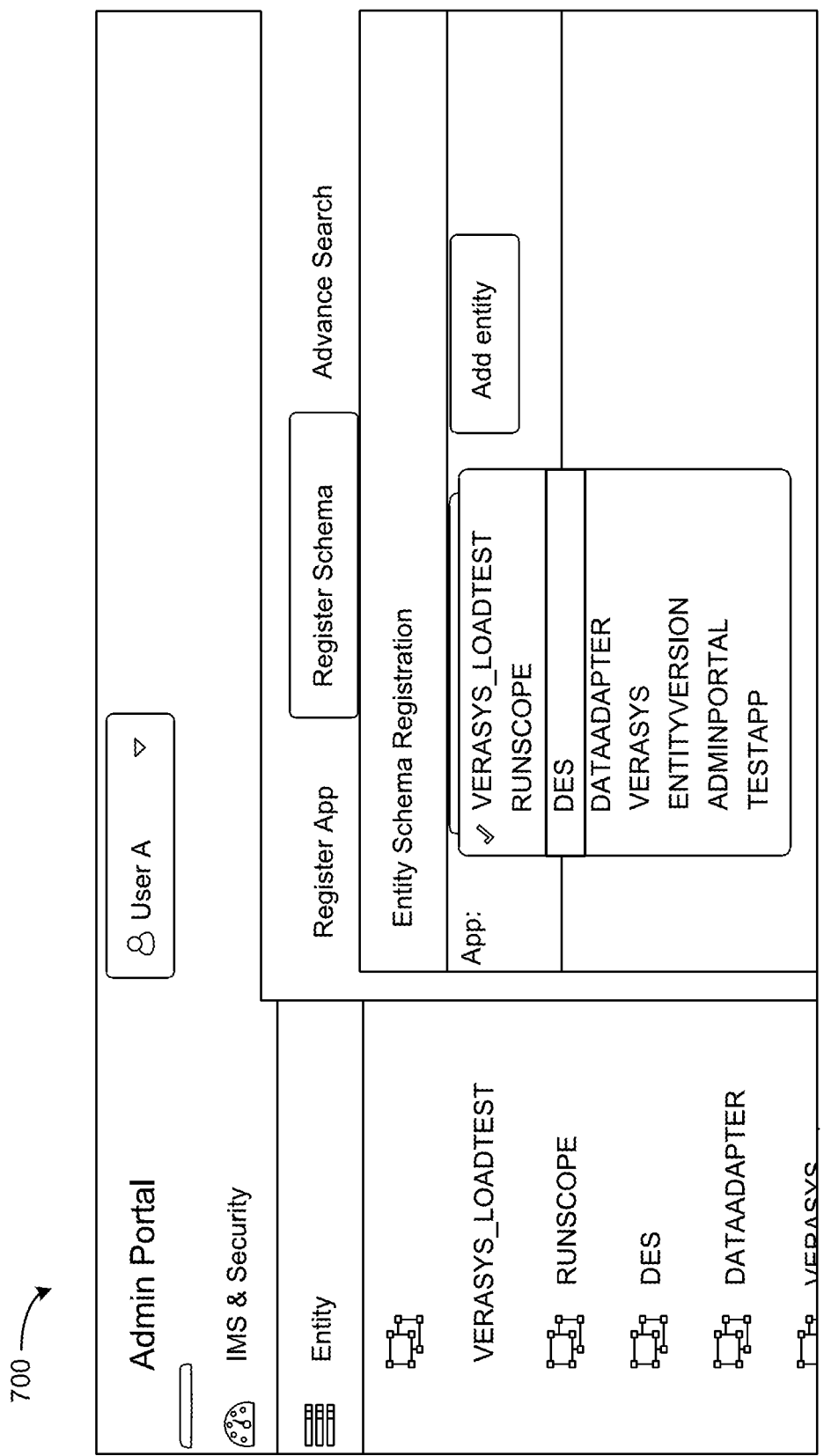
FIG. 7A is an illustration of an example interface for entity creation associated with the platform of FIG. 5, according to some embodiments.
Figure 7B:
FIG. 7B is an illustration of an example interface for entity searching associated with the platform of FIG. 5, according to some embodiments.

Turning to FIG. 7A, an entity creator interface 700 is shown, according to an exemplary embodiment. Interface 700 can be used to easily create and define custom entities as well as associate entities with various applications built on platform 500. FIG. 7B shows a search interface 750, according to an exemplary embodiment. Interface 750 can allow users to easily search for entities, applications, and devices associated with platform 500.

Turning to FIG. 8, an example of a directed acyclic graph (DAG) 800 is shown, according to an exemplary embodiment. DAG 800 can define inputs, computation, and outputs through formation of a directed graph as opposed to writing code. Some examples of benefits that can be achieved using DAG 800 include combining with other DAGs (e.g., steps with similar inputs), combining nodes (e.g., algebraic relationships), scheduling of operators, aggregations for dashboards, cleaning operations, logical operations, fault detection, machine learning predictions and classifications, billing operations, and processing of a variety of data (e.g., sensor, event, image, text, JSON).

Figure 9:
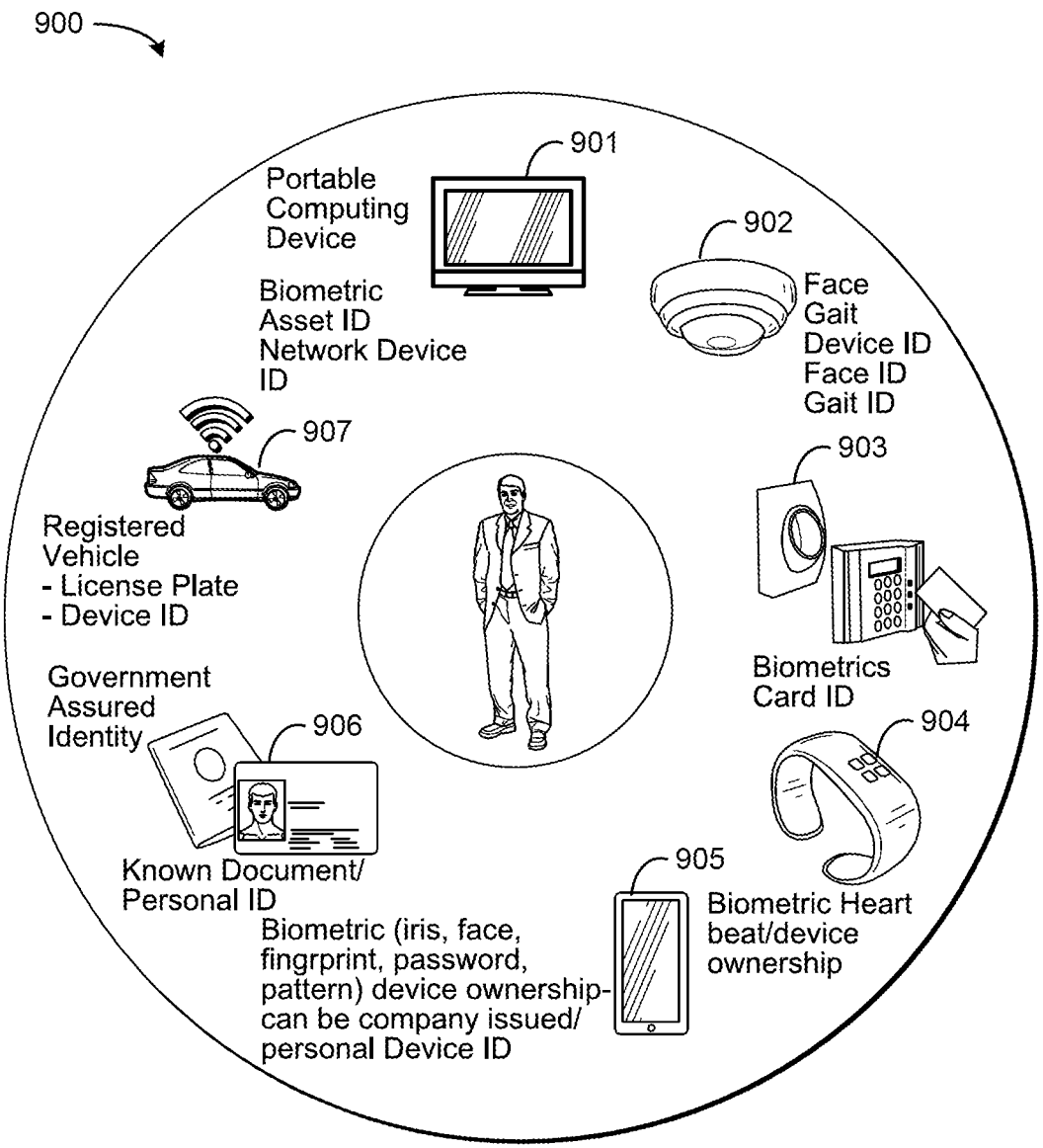
FIG. 9 is an illustration of various identifiers that can be used to deliver frictionless access control facilitated by the platform of FIG. 5, according to some embodiments.

Turning to FIG. 9, a diagram 900 of various identifiers that can be used by computing platform 500 is shown, according to an exemplary embodiment. These identifiers can be used to determine identity information for access and authorization, for example. Diagram 900 is shown to include a computing device 901 (e.g., smartphone, laptop, tablet), a camera 902 (e.g., for facial recognition, gait analysis, etc.), a card reader 903, a wearable device 904 (e.g. smart watch), user device information 905 (e.g., a received text message, facial recognition performed by a user device, fingerprint scanning by user device, etc.), a documented identity 906 (e.g., driver's license, passport, etc.), and a vehicle (e.g., license plate, vehicle software, etc.). Any of the identifiers shown in diagram 900 may be used to achieve frictionless access control. Other identifiers are also possible, such as voice identification. This security solution can integrate people, technology, devices, and processes in order to automate a variety of manual efforts and create a better experience for everyone involved.

Figure 10:
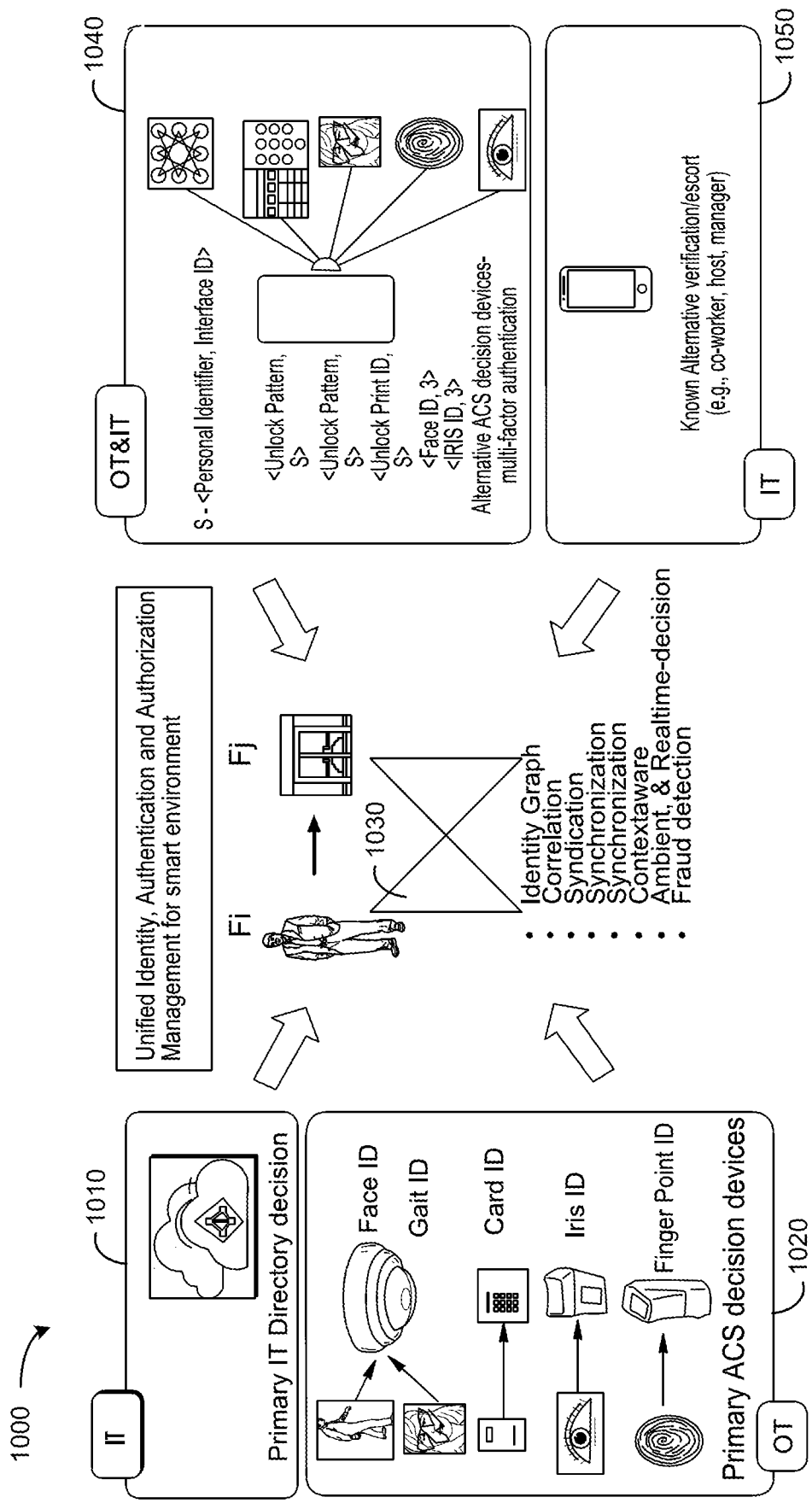
FIG. 10 is an illustration of components involved in identity unification associated with the platform of FIG. 5, according to some embodiments.

Turning to FIG. 10, an diagram 1000 of identity unification that can be performed by platform 500 is shown, according to an exemplary embodiment. A heterogeneous identity unification, syndication, correlation, and synchronization service can be employed within the smart building environment to achieve frictionless access control. Frictionless access control can employ advanced AI, biometrics, and other identity verification processes to improve access and authorization procedures throughout the smart building environment. For example, many workplaces use access cards and associated sensors to restrict employee access to certain areas of the workplace. Frictionless access control provided by platform 500 can eliminate the need for access cards and instead employ technologies such as facial recognition, voice verification, and mobile device scanning, for example. An open, extensible reference architecture can be used in order to support agility and flexibility imperatives. Heterogeneous identity fusion and a situational multi-factor authorization engine can eliminate the need for access cards in physical security management.

Diagram 1000 is shown to include a directory 1010 maintained by platform 500. Directory 1010 can include a variety of identity information related to individuals associated with a building such as facial recognition information, user devices associated with individuals, fingerprint information, iris information, role within an organization, access rights, emergency contact information, etc. Diagram 1000 is also shown to include access control devices 1020. Access control devices 1020 can include cameras, card readers, iris scanners, a fingerprint readers, in addition to other types of devices. Platform 500 may receive identity information from access control devices 1020 and compare this information to directory 1010. Once platform 500 has identified an individual (e.g., attempting to enter an access point), platform 500 can send an authorization request to a user of the user device such that multiple factors of authorization are used before granting access, for example. Diagram 1040 is shown to include possible methods for an individual to receive and complete an authorization request such as entering a passcode or unlock pattern, scanning an access card, performing an iris scan, scanning a fingerprint, or performing a facial recognition process. An authorization request generated by platform 500 may also include alternative verification methods 1040 such as requiring an escort to enter an access point or obtaining approval from a manager. With all of this identity information, platform 500 can generate an identity graph 1030 that represents probability of correct identification of an individual, possibility of fraud, access rights, importance of the individual, etc. Identity graph 1030 can ultimately be used by platform 500 to make a decision on granting access.

Figure 11:
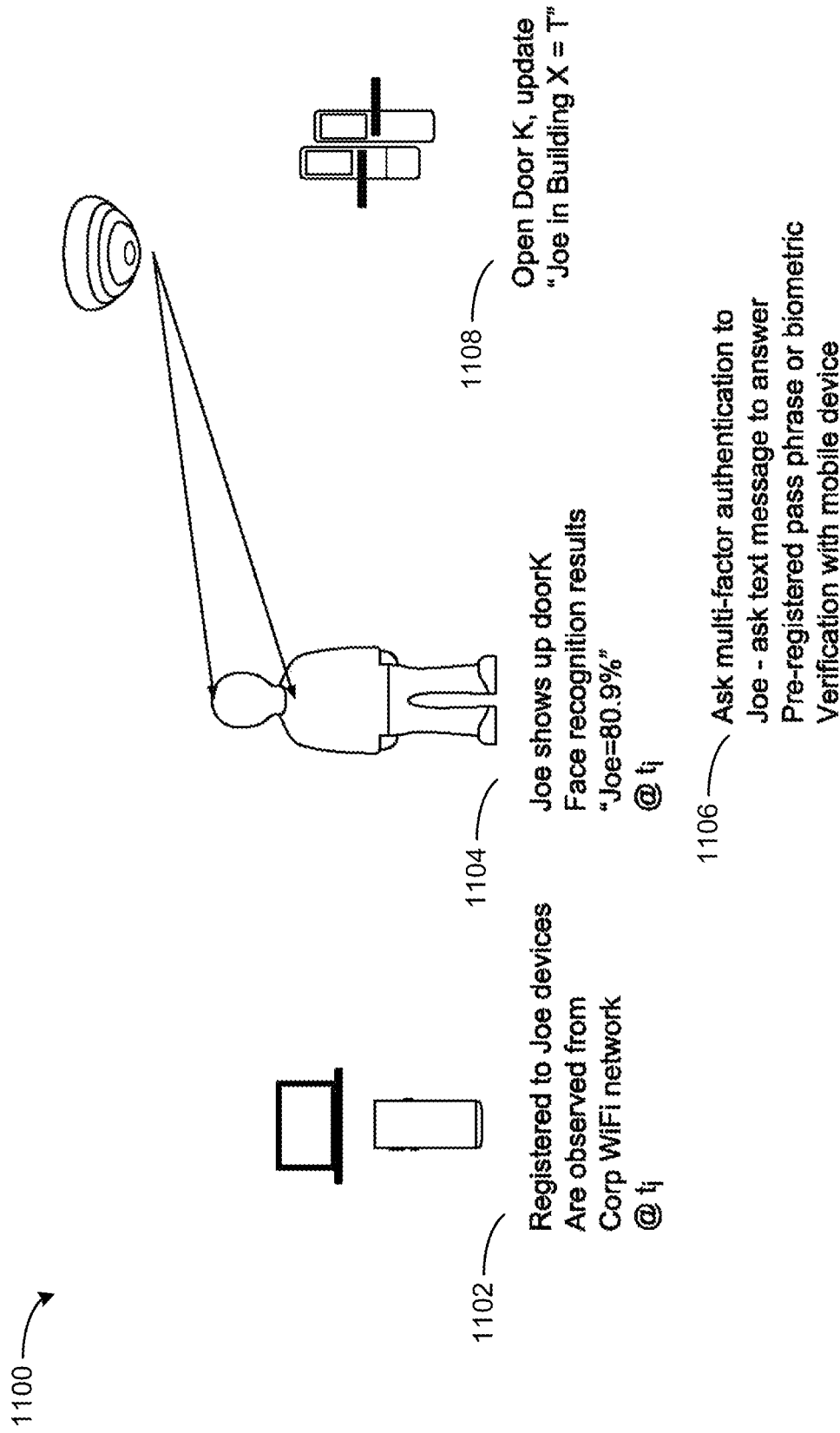
FIG. 11 is an illustration of an example multi-factor authentication process associated with the platform of FIG. 5, according to some embodiments.

Turning to FIG. 11, an illustration of an example multi-factor authentication process 1100 that can be facilitated by platform 500 is shown, according to an exemplary embodiment. As shown, a person must pass both a facial recognition test as well as mobile device authorization in order to open a door in a building. At step 1102, platform detects that a device associated with an individual has been connected to a building network such as a corporate Wi-Fi network. At step 1104, a camera obtains video/images of the individual and initiates a facial recognition process. At step 1106, platform 500 sends an authorization request to the individual in the form of a text message or push notification to the device recognized in step 1102 and the individual completes the authorization request. Finally, platform 500 grants the individual access to the access point by unlocking an electronic door lock at step 1108. This illustration serves as an example of one possibility of an authorization and access procedure possible with frictionless access control in the integrated smart environment where the user completes an authorization request.

The integrated smart environment for a building campus can also include assurance services provided by platform 500. The assurance services or device management services can provide consistent asset registration, provisioning, and life-cycle management. As the number and variety of connected devices within the smart building environment increases, the management of these devices can become complex and non-trivial. The assurance services can address concerns regarding compliance, provisioning, registration, real-time health monitoring, and predictive failure of a variety of connected assets within the smart building environment. The assurance services can include a master device integration service that can provide unified compliance reporting, optimization of warranty management, lifecycle cost modeling, and the elimination of manual inventory management, for example. In some previous systems, connected building devices are only accessibly through the device manufacturer, and service providers and other users may not have access to such devices.

Figure 12:
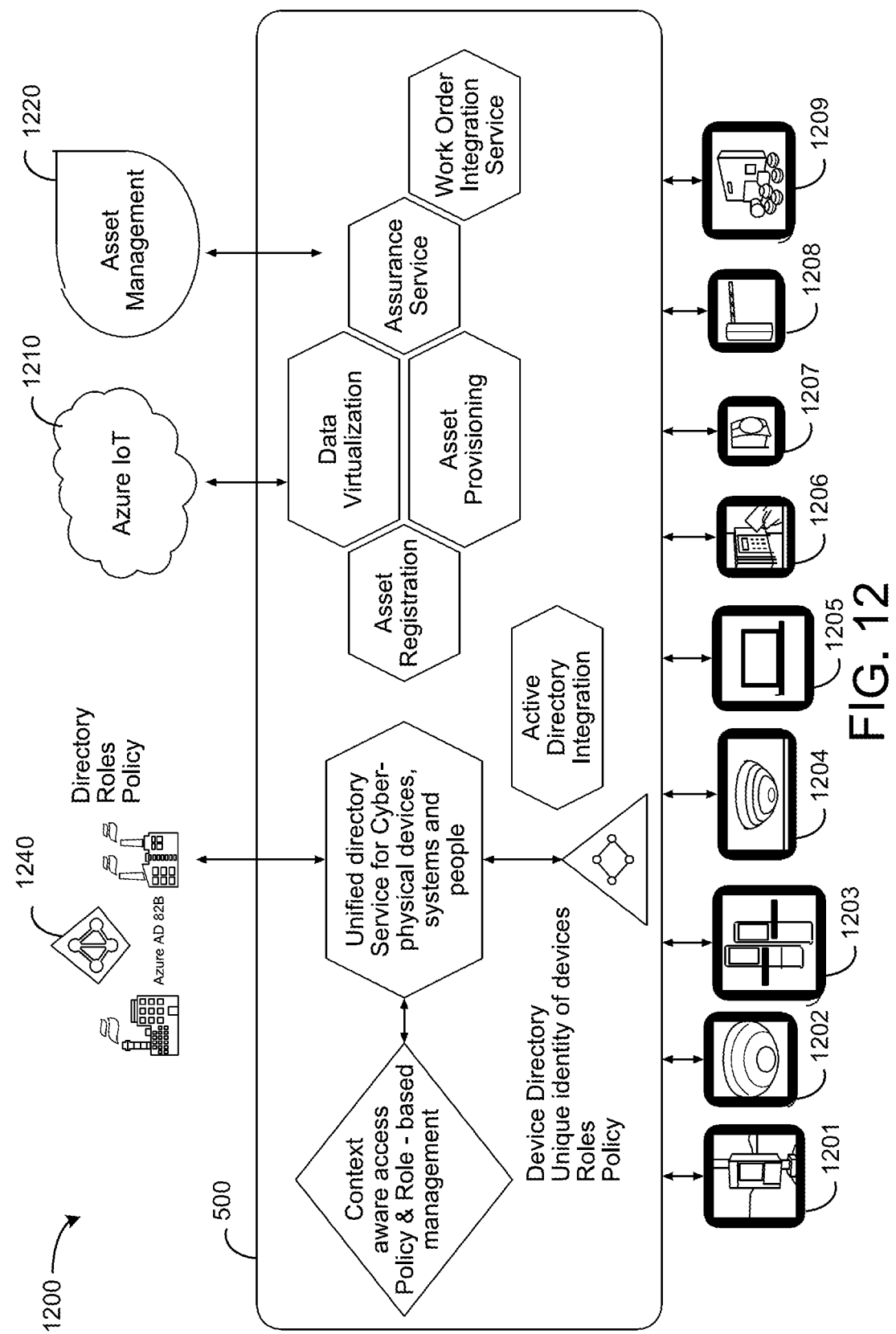
FIG. 12 is an illustration of high level components used to deliver device management services associated with the platform of FIG. 5, according to some embodiments.

Turning to FIG. 12, an diagram 1200 of components of an assurance service provided by platform 500 is shown, according to an exemplary embodiment. The assurance service may also be referred to as a device or asset management service. As shown, platform 500 is connected to a variety of devices such as a telephone 1201, a fire alarm 1202, an electronic lock 1203, a security camera 1204, a user device 1205, a card reader 1206, a fingerprint reader 1207, a parking gate 1208, and a fire detection system 1209. Each of these devices can be registered within platform 500 such that building stakeholders and other individuals associated with a building can manage, edit, and monitor data associated with devices produced by any manufacturer. The assurance service may also utilize third party IoT services 1210 and asset management services 1220. Further, a platform 500 can be configured to maintain a device directory 1240.

Figure 13:
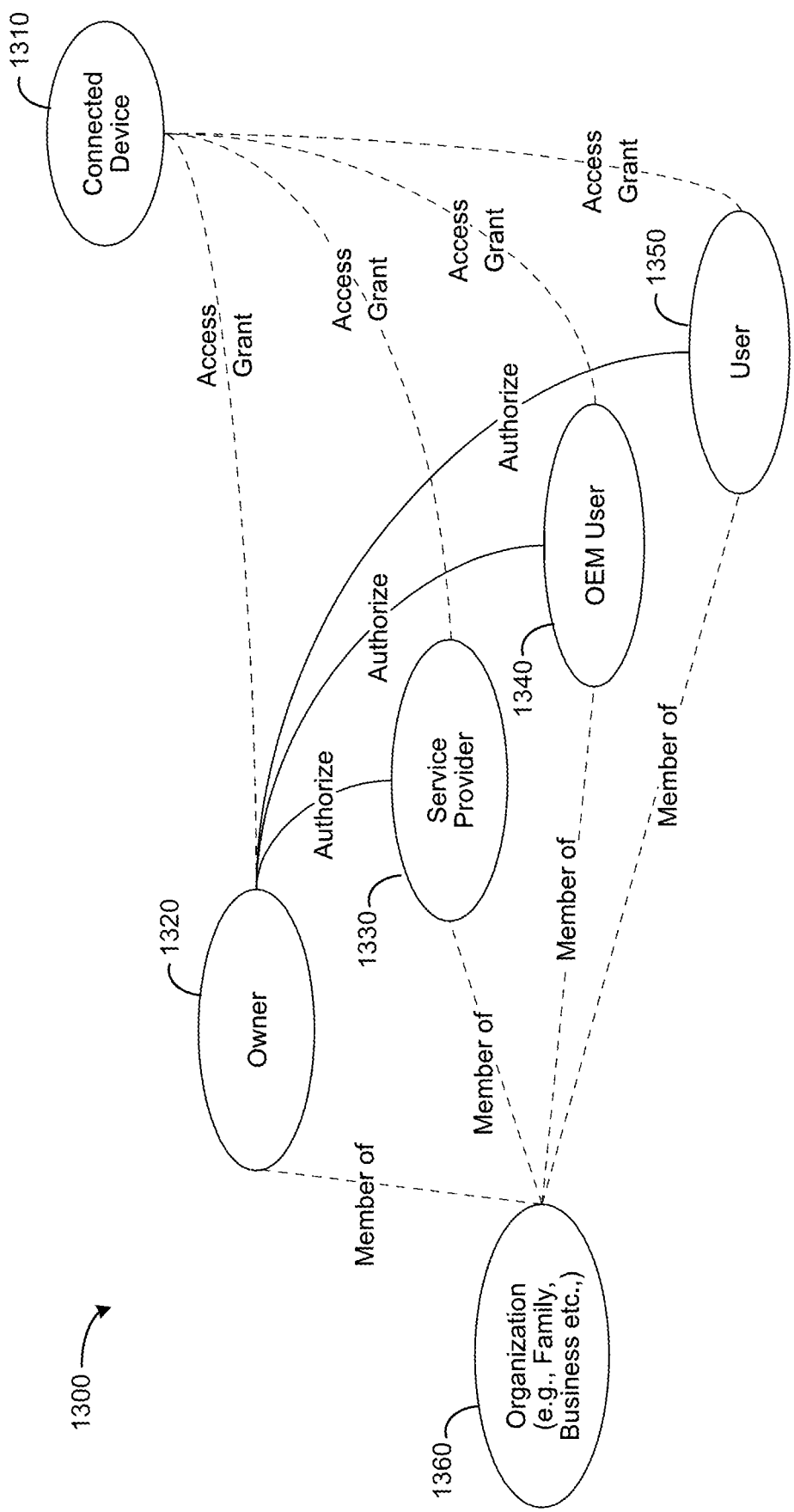
FIG. 13 is a diagram of authorization and access relationships associated with the platform of FIG. 5, according to some embodiments.

Turning to FIG. 13, a diagram 1300 of authorization and access relationships involved in the assurance services provided by platform 500 is shown, according to an exemplary embodiment. A connected device, in some embodiments, can be accessed by four distinct user groups: an enterprise-level manager 1340 (e.g., original equipment manufacturer, OEM) for services under warranty, a service provider 1330 for repair and maintenance, users for normal access 1350 (e.g., temperature control and change camera view), and owners 1320. The authorization structure as shown in FIG. 13 can enable significant simplification of access control to be delivered by the smart building environment. The organization of these relationships indicated by block 1360 can be defined and managed by platform 500. This structure allows controlled access to all connected devices 1310 within platform 500.

As part of the assurance services provided by platform 500, a registration service can provide a variety of interfaces. These interfaces may include: new device registration, new application registration, revoking of device registration, create/read/update/delete on any device, transfer of device ownership, replacement of a physical device and restoration of existing configuration, management of device association, and various querying and retrieval of devices. In some embodiments, an application must go through a claiming process in order to create access and authorization policies among a device, a user, a group, an organization, and/or an application.

Figure 14:
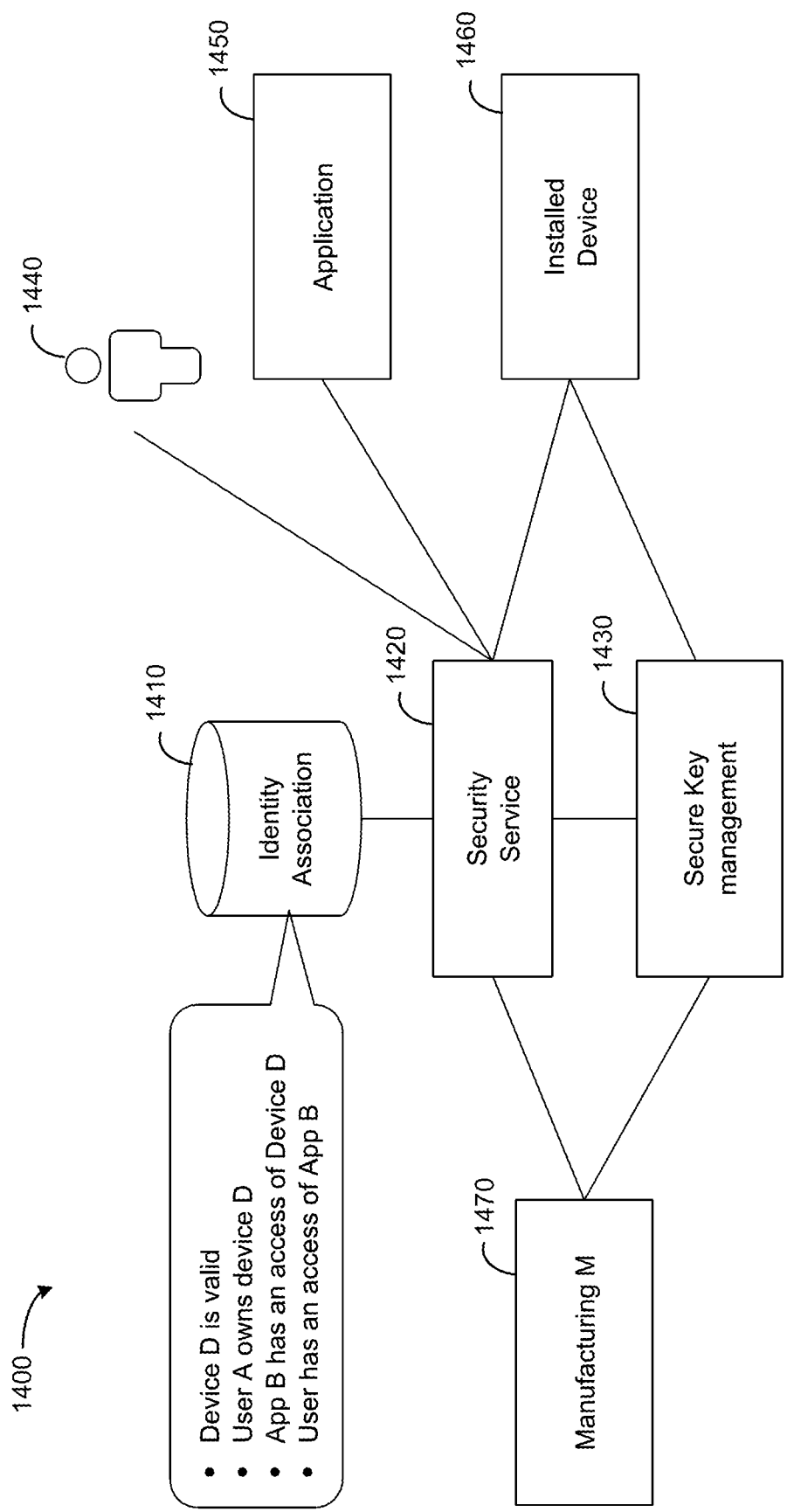
FIG. 14 is a diagram of components involved in a device registration and claiming process associated with the platform of FIG. 5, according to some embodiments.

Turning to FIG. 14, a diagram 1400 of components involved in a registration and claiming process for a connected device is shown, according to an exemplary embodiment. In some embodiments, in order to connect a device to cloud services, the device must go through both a registration and a claiming process. During registration, a device may obtain security tokens through the assurance services by using secret keys and/or identities loaded on the device during manufacturing. Once a device has received security tokens, the device can be registered with cloud services (e.g., a gateway). In some embodiments, the exchange of keys and tokens is secured by registering devices to a blockchain. A device shadow can be created during the registration process and made available to other applications. When the registration process is completed, the device can be registered into a common registry, keys for future registrations can be created, and a template of device descriptions including a set of telemetry data points can be registered as well. After a device is registered, it can then be claimed by various user, applications, etc. within platform 500. Accordingly, diagram 1400 is shown to include identity association 1410 (e.g., device directory), a security service component 1420, a secure key management component 1430, a user 1440, an application 1450, a device 1460, and device information obtained from manufacturing 1470. Each of these components play a role in device registration and claiming within platform 500 as discussed above.

Figure 15:
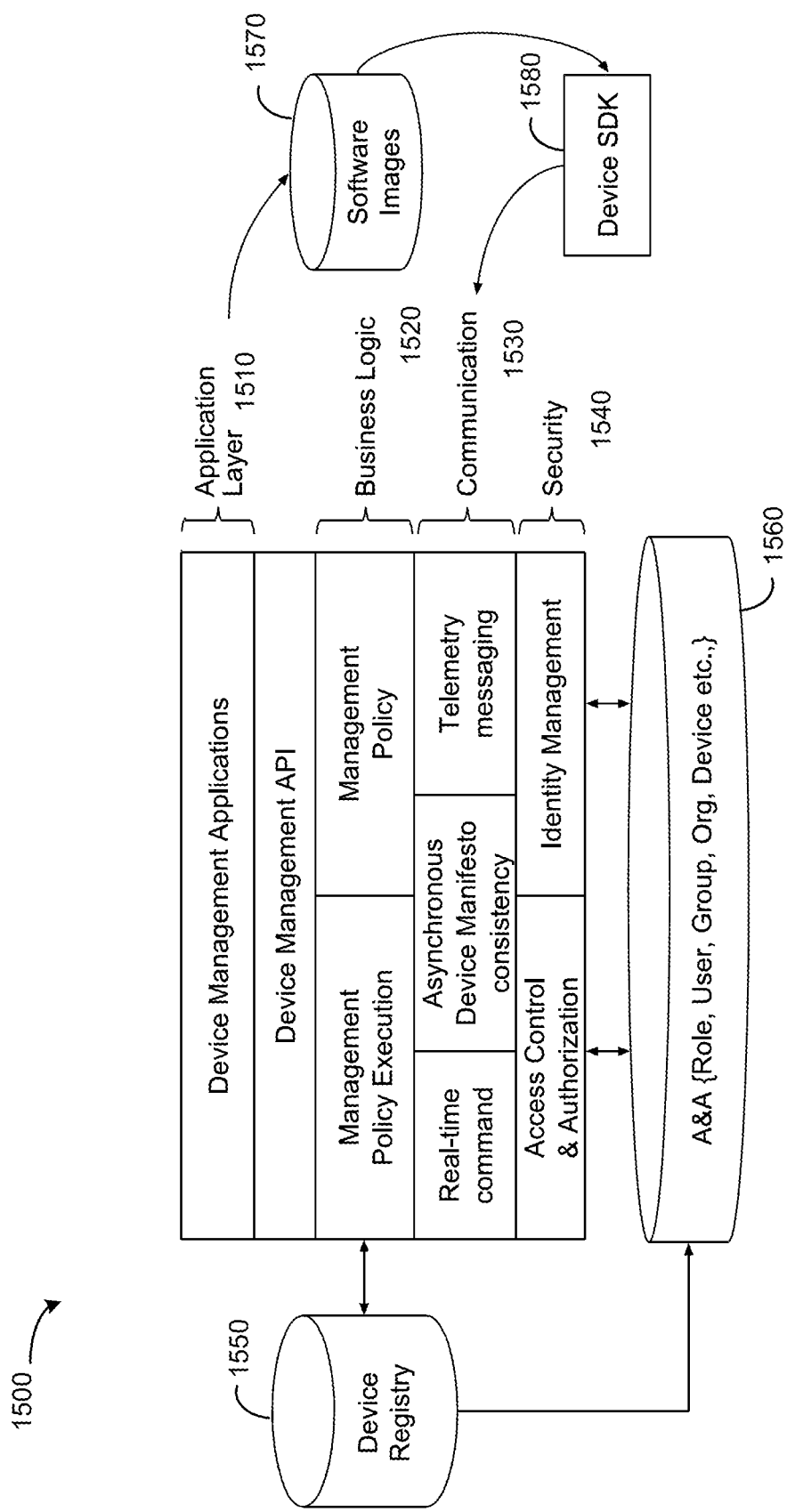
FIG. 15 is a block diagram of a device management architecture associated with the platform of FIG. 5, according to some embodiments.

Turning to FIG. 15, a diagram 1500 of a reference architecture for device management and real-time monitoring is shown, according to an exemplary embodiment. Identity management, access control, and authorization can be critical to ensuring that a device can be managed by various applications and users. Application development that integrated connected devices can be supported by the provision of device management APIs by platform 500. Each device may have a unique identifier in a device registry and can be tied to users, applications, and other devices through role-based secure communication environments. Various possibilities for device management rules can be implemented. For example, a rule may be applied to stop software updates for any devices no longer under warranty. In some embodiments, users must go through a claim process in order to access a gateway and associated telemetry data points, command, control, or device shadow information. Accordingly, diagram 1500 is shown to include an application layer 1510, a business logic layer 1520, a communications layer 1530, and a security layer 1540 in addition to a device registry 1550, an access and authorization database 1560, software images 1570, and device software development kit 1580.

Figure 16:
FIG. 16 is an interface showing role-based unified connected device, application, user, and organization management, according to some embodiments.

Turning to FIG. 16, an interface 1600 provided by platform 500 that shows role-based unified connected device, application, user, and organization management is shown, according to an exemplary embodiment. The assurance services provided by platform 500 can allow for consistent asset registration, provisioning, and life cycle management within the smart building environment. Interface 1600 allows users to easily access and mage such relationships.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for providing access control in a building, the system comprising:
    an access control device, the access control device configured to control access to an area of the building; and
    a computing system configured to:
        manage a smart entity database, the smart entity database indicating a plurality of entities including a plurality of individuals associated with the building and a plurality of access control devices, the smart entity database including a plurality of relationships between the plurality of entities, the plurality of relationships indicating whether the plurality of individuals have authorization to access areas associated with the plurality of access control devices;
        receive identity information of an individual from the access control device;
        identify the individual in the smart entity database based on the identity information;
        determine that the individual has access to the area of the building based on one relationship of the plurality of relationships of the smart entity database relating a first entity associated with the individual to a second entity associated with the access control device; and
        authorize the individual to enter the area of the building responsive to determining that the individual has access to the area of the building.

2. The system of claim 1, wherein the access control device comprises an iris recognition device, a camera, a fingerprint reader, or a card reader.

3. The system of claim 1, wherein the identity information comprises information related to a fingerprint, a facial recognition process, an iris scan, a card read, or a user device.

4. The system of claim 1, wherein the computing system is configured to receive an authorization request, the authorization request comprising a request related to a passcode, a facial recognition process, an iris scan, a fingerprint, or a text message.

5. The system of claim 1, further comprising one or more additional access control devices configured to obtain additional identity information used by the computing system to authorize the individual to enter the area of the building.

6. The system of claim 1, wherein the access control device is associated with a door, a turnstile, a parking gate, or an elevator.

7. The system of claim 1, wherein the computing system is configured to:
    identify a user device associated with the individual using the smart entity database;
    send an authorization request to the user device; and
    authorize the individual to enter the area of the building upon completion of the authorization request.

8. The system of claim 7, wherein the user device is a smartphone, a tablet, a laptop, a wearable device, or a vehicle.

9. A method comprising:
    managing, by a processing circuit, a smart entity database, the smart entity database indicating a plurality of entities including a plurality of individuals associated with a building and a plurality of access control devices, the smart entity database including a plurality of relationships between the plurality of entities, the plurality of relationships indicating whether the plurality of individuals have authorization to access areas associated with the plurality of access control devices;
    receiving, by the processing circuit, identity information of an individual from an access control device;
    identifying, by the processing circuit, the individual in the smart entity database based on the identity information;
    determining, by the processing circuit, that the individual has access to an area of the building based on one relationship of the plurality of relationships of the smart entity database relating a first entity associated with the individual to a second entity associated with the access control device; and authorizing, by the processing circuit, the individual to enter the area of the building responsive to determining that the individual has access to the area of the building.

10. The method of claim 9, wherein the access control device comprises an iris recognition device, a camera, a fingerprint reader, or a card reader.

11. The method of claim 9, wherein the identity information comprises information related to a fingerprint, a facial recognition process, an iris scan, a card read, or a user device.

12. The method of claim 9, further comprising receiving, by the processing circuit, an authorization request, the authorization request comprising a request related to a passcode, a facial recognition process, an iris scan, a fingerprint, or a text message.

13. The method of claim 9, wherein the access control device is associated with a door, a turnstile, a parking gate, or an elevator.

14. The method of claim 9, further comprising:
identifying, by the processing circuit, a user device associated with the individual using the smart entity database;
sending, by the processing circuit, an authorization request to the user device; and
authorizing, by the processing circuit, the individual to enter the area of the building upon completion of the authorization request.

15. The method of claim 14, wherein the user device is a smartphone, a tablet, a laptop, a wearable device, or a vehicle.

16. A system for providing access control in a building, the system comprising one or more storage devices storing instructions thereon that, when executed by one or more processors, cause the one or more processors to:

manage a smart entity database, the smart entity database indicating a plurality of entities including a plurality of individuals associated with the building and a plurality of access control devices, the smart entity database including a plurality of relationships between the plurality of entities, the plurality of relationships indicating whether the plurality of individuals have authorization to access areas associated with the plurality of access control devices;
receive identity information of an individual from an access control device;
identify the individual in the smart entity database based on the identity information;
determine that the individual has access to an area of the building based on one relationship of the plurality of relationships of the smart entity database relating a first entity associated with the individual to a second entity associated with the access control device; and
authorize the individual to enter the area of the building responsive to determining that the individual has access to the area of the building.

17. The system of claim 16, wherein the access control device comprises an iris recognition device, a camera, a fingerprint reader, or a card reader.

18. The system of claim 16, wherein the access control device is associated with a door, a turnstile, a parking gate, or an elevator.

19. The system of claim 16, wherein the instructions cause the one or more processors to:
identify a user device associated with the individual using the smart entity database;
send an authorization request to the user device; and
authorize the individual to enter the area of the building upon completion of the authorization request.

20. The system of claim 19, wherein the user device is a smartphone, a tablet, a laptop, a wearable device, or a vehicle.

* * * * *